(12) United States Patent
Takarada

(10) Patent No.: US 6,961,479 B1
(45) Date of Patent: Nov. 1, 2005

(54) IMAGE PROCESSING DEVICE, IMAGE PROCESSING METHOD, IMAGE-PROCESSING PROGRAM RECORDED MEDIUM

(75) Inventor: Shinichi Takarada, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 678 days.

(21) Appl. No.: 09/787,277
(22) PCT Filed: Jul. 13, 2000
(86) PCT No.: PCT/JP00/04716
§ 371 (c)(1), (2), (4) Date: Jun. 15, 2001
(87) PCT Pub. No.: WO01/06456
PCT Pub. Date: Jan. 25, 2001

(30) Foreign Application Priority Data
Jul. 15, 1999 (JP) .......................... 11-201120

(51) Int. Cl.⁷ .............................. G06K 9/32; H04N 1/46
(52) U.S. Cl. ....................................... 382/300; 358/525
(58) Field of Search ................................ 382/298–300; 358/1.2, 525; 345/609–610; 375/240.01

(56) References Cited

U.S. PATENT DOCUMENTS

| 4,853,794 A | 8/1989 | Fukumoto et al. .......... 358/447 |
| 5,875,268 A | 2/1999 | Miyake ...................... 382/276 |
| 6,236,766 B1 * | 5/2001 | Zavaljevski et al. ........ 382/300 |
| 6,650,704 B1 * | 11/2003 | Carlson et al. ........ 375/240.01 |
| 6,654,510 B1 * | 11/2003 | Kawabe ...................... 382/298 |

FOREIGN PATENT DOCUMENTS

| JP | 63-266982 | 11/1988 |
| JP | 3-225479 | 10/1991 |
| JP | 7-93531 | 4/1995 |

* cited by examiner

Primary Examiner—Kanjibhai Patel
(74) Attorney, Agent, or Firm—Wenderoth, Lind & Ponack, L.L.P.

(57) ABSTRACT

In an image processor, an image processing method, and an image processing program recording medium, an intensity of a new pixel is calculated on the basis of an intensity of a pixel of interest, an intensity of an original pixel adjacent at an upper side of the pixel of interest, an intensity of an original pixel adjacent at a lower side of the pixel of interest, an intensity of an original pixel adjacent at a left side of the pixel of interest, and an intensity of an original pixel adjacent at the right side of the pixel of interest.

15 Claims, 13 Drawing Sheets

IMAGE PROCESSING DEVICE, IMAGE PROCESSING METHOD, IMAGE-PROCESSING PROGRAM RECORDED MEDIUM

TECHNICAL FIELD

The present invention relates to an image processor, an image processing method and an image processing program recording medium and, more particularly, to those which can enlarge an image which has tone in each pixel by performing resolution conversion with easy arithmetic processing and obtain a high-quality resolution image while enlarging the same. For example, the present invention relates to those which are suitable for being applied in an image output apparatus such as a printer for outputting input image information by interpolating or a display unit for performing a screen display equivalent that is equivalent to a Hi-Vision image display by interpolating a current NTSC video signal.

BACKGROUND ART

FIG. 14 illustrates an example of a condition in which the above-mentioned type image processor is used. In the figure, numeral 1401 denotes a PC(personal computer), 1402 denotes an image processor for enlarging an image that is output from the PC, and 1403 denotes an LCD projector for displaying the output of the image processor 1402.

A video signal is output having as 640×480 pixels from the monitor output line of PC 1401. The image processor 1402 for performing resolution conversion is connected between the PC 1401 and the LCD projector 1403 so as to display the video signal on the LCD projector 1403 which has a resolution of 1280×960 pixels.

Thereby, a low-resolution image output from PC 1401 is converted to a high-resolution image, and even when an image of a PC is subjected to an enlarged projection display on a screen by the LCD projector 1403, the projected image is prevented from being roughly displayed.

Various methods have been proposed for resolution conversion processing which enlarge a low-resolution image by interpolating. The most common method is a linear interpolation for linearly interpolating an intensity of new pixels from peripheral original pixels.

FIG. 4 is a diagram showing an interpolation position of pixels according to the conventional linear interpolation method.

In FIG. 4, numeral 401 denotes an original pixel with intensity G, 402 denotes an original pixel with intensity H, 403 denotes an original pixel with intensity 1 and 404 is an original pixel with intensity J. The interval between these original pixels of low-resolution image, that is, the interval between adjacent pixels in each of the horizontal or vertical directions is "1". Numeral 405 denotes a new pixel with intensity K which is obtained by conventional linear interpolation. "m" presents the distance from the original pixel 401 to the new pixel 405 in the vertical direction, "n" presents the distance from the original pixel 401 to the new pixel 405 in the horizontal direction, and these distances "m" and "n" are assumed to be 0≦m<1 and 0≦n<1.

The intensity K of new pixel 405 will be calculated by the following equation.

$$K=(1-m)((1-n)G+nH)+m((1-n)1+nJ)$$

According to the conventional linear interpolation, it performs interpolation by linear interpolation and the required operation times for calculating the new pixel is six times of multiplication and five times of adding and subtraction.

In the conventional linear interpolation, there is a problem in that an image is smoothed by averaging processing with peripheral original pixels, thereby resulting in blurred images with the edge parts thereof lacking in sharpness.

There is an image processor disclosed in the Japanese Published Patent Application No.7-93531 which can solve the problems that the edge parts of an image is blurred by averaging processing. The image processor is one which performs linear interpolation arithmetic as well as performs smoothing after adding arithmetic processing for creating edges in accordance with the condition of peripheral images. Thereby, the edge parts are cleared, resulting in high-quality images.

However, the image processor disclosed in Japanese Published Patent Application 7-93531 has a problem in that the entire processing time is increased as well as the device becomes costly when constructed in hardware, because it requires an edge making arithmetic processing in addition to the linear interpolation.

Further, when a low-resolution image is interpolated and converted to a high-resolution image, in particular, to an image having twice the number of pixels in each of the vertical and horizontal directions, the amount of arithmetic processing can be reduced by devising the pixel arrangement. The arrangement in this case will be described with referring to FIG. 6.

FIG. 6 is a diagram showing a pixel arrangement when performing resolution conversion to twice the number of pixels in each of the vertical and horizontal directions by a conventional image processing method.

In FIG. 6, "○" designates an original pixel of low-resolution image, "□" designates a new pixel of high-resolution image. The pixel arrangement in FIG. 6 omits arithmetic processing for calculating the intensity of a new pixel 604 by matching the position of an original pixel 601 with the position of new pixel 604, and matching also for their intensity. In addition, a new pixel 606 is calculated based upon the original pixel 601 and the original pixel 602, and a new pixel 610 is calculated based upon new pixels 606, 607, 608 and 609.

According to the pixel arrangement in FIG. 6, though the intensity of new pixel 604 which corresponds to the original pixel 601 includes no error, the intensity value of new pixel 606 which is calculated based upon the original pixels 601 and 602 may include an error. Further, the intensity value of new pixel 610 which is calculated based upon the new pixel 606 may include a greater error. Thus, there arises an interpolation result in which the appearance probability of error varies depending on the intensity of the new pixel.

As mentioned above, the conventional image processing method for converting a low-resolution image to a high-resolution image performs averaging of the intensity of original pixels at a periphery of a new pixel, thereby resulting in a problem that an interpolated image is smoothed and results in blurred images in which edge parts thereof lose sharpness.

Further, the image processor disclosed in Japanese Published Patent Application 7-93531 has a problem in that the entire processing time becomes longer due to an edge making arithmetic processing and a problem in that it becomes costly when it is produced in hardware.

Further, in a case where a pixel arrangement is devised so as to decrease the amount of arithmetic processing, there may be a case in which the appearance probability of an error of pixel data varies depending on pixels.

The present invention is made to solve the above-mentioned problems and has for its object to provide an image processor, an image processing method and an image processing program recording medium which can obtain a high-quality image with sharpness which requires a decreased amount of interpolation arithmetic so as to improve an image resolution, decrease processing time, and provide a small scaled hardware, and further, which can make uniform the appearance probability of error of pixel data in a case where a pixel arrangement is performed so as to minimize the amount of arithmetic processing.

DISCLOSURE OF INVENTION

The image processing apparatus according to claim 1 of the present invention provides an image processor which converts a low-resolution image to a high-resolution image that includes a pixel selection means for selecting a pixel of interest which is located at a position closest to a pixel for interpolation to be newly generated between pixels (hereinafter, simply referred to as "new pixel") and adjacent pixels adjacent the pixel of interest from the pixels of the low-resolution image, respectively, and new pixel data calculation means for calculating the difference between the adjacent pixels putting between the pixel of interest, obtaining the amending value on the basis of the difference and the distance between the pixel of interest and the new pixel, and calculating the data value of the new pixel on the basis of the data of the pixel of interest, the difference, and the amending value.

According to the image processor of a first aspect of the present invention having the above-described construction, it is possible to carry out the interpolation of image with a small operation amount as well as obtain image with sharpness.

The image processing method according to a second aspect of the present invention provides an image processing method which converts a low-resolution image to a high-resolution image that includes a pixel selection step for selecting a pixel of interest which is located at a position closest to a pixel for interpolation to be newly generated between pixels (hereinafter, simply referred to as "new pixel") and adjacent pixels adjacent the pixel of interest, respectively, from the pixels of the low-resolution image, and new pixel data calculation step for obtaining the difference between the adjacent pixels putting between the pixel of interest, obtaining the amending value on the basis of the difference and the distance between the pixel of interest and the new pixel, and calculating the data value of the new pixel on the basis of the data of the pixel of interest, the difference, and the amending value.

According to the image processing method of the second aspect of the present invention having the above-described construction, it is possible to carry out the interpolation of image with a small operation amount as well as obtain an image with sharpness.

The image processing program recording medium according to a third aspect of the present invention has stored an image processing program performing conversion of a low-resolution image into a high-resolution image therein, which program includes a pixel selection step for selecting a pixel of interest which is located at a position closest to a pixel for interpolation to be newly generated between pixels (hereinafter, simply referred to as "new pixel") and adjacent pixels adjacent the pixel of interest, from the pixels of the low-resolution image, respectively, and new pixel data calculation step for obtaining the difference between the adjacent pixels putting between the particular pixel, obtaining the amending value on the basis of the difference and the distance between the pixel of interest and the new pixel, and calculating the data value of the new pixel on the basis of the data of the pixel of interest, the difference, and the amending value.

According to the image processing program recording medium of the third aspect of the present invention having the above-described construction, it is possible to carry out an interpolation of image with a small operation amount as well as obtain an image with sharpness.

The image processor according to a fourth aspect of the present invention provides an image processor according to the first aspect in which the pixel selection means is one which selects data A of the pixel of interest of the low-resolution image, located at a position closest to a pixel for interpolation to be newly created (hereinafter, referred to as "new pixel") between pixels of the low-resolution image having distances of "1" between adjacent pixels, data B of upper pixel of the low-resolution image adjacent the pixel of interest at upper side thereof, data C of lower pixel of the low-resolution image adjacent the picture of interest at lower side thereof, data D of left pixel of the low-resolution image adjacent the pixel of interest at left side thereof, and data E of right pixel of the low-resolution image adjacent the pixel of interest at right side thereof, and the new pixel data calculation means is one which calculates data F of new pixel composing the high-resolution image by a formula of $F=A+(i/2)(E-D)+(j/2)(C-B)$ on the basis of data A of pixel of interest, data B of upper pixel, data C of lower pixel, data D of left pixel, data E of right pixel, the position of the new pixel (i, j) which are represented by a distance "i" in the horizontal direction and a distance "j" in the vertical direction from the pixel of interest to the new pixel.

According to the image processor of the fourth aspect of the present invention having the above-described construction, it is possible to carry out the interpolation of image with a small operation amount as well as obtain image with sharpness.

The image processing method according to a fifth aspect of the present invention provides an image processing method according to the second aspect in which the pixel selection process is one which selects data A of the pixel of interest of the low-resolution image, located at a position closest to a pixel for interpolation to be newly created (hereinafter, referred to as "new pixel") between pixels of the low-resolution image having distances of "1" between adjacent pixels, data B of upper pixel of the low-resolution image adjacent the pixel of interest at upper side thereof, data C of lower pixel of the low-resolution image adjacent the pixel of interest at lower side thereof, data D of left pixel of the low-resolution image adjacent the pixel of interest at left side thereof, and data E of right pixel of the low-resolution image adjacent the pixel of interest at right side thereof, and the new pixel data calculation process is one which calculates data F of new pixel composing the high-resolution image by a formula of $F=A+(i/2)(E-D)+(j/2)(C-B)$ on the basis of data A of pixel of interest, data B of upper pixel, data C of lower pixel, data D of left pixel, data E of right pixel, the position of the new pixel (i, j) which is represented by a distance "i" in the horizontal direction and a distance "j" in the vertical direction from the pixel of interest to the new pixel.

According to the image processing method of the fifth aspect of the present invention having the above-described construction, it is possible to carry out the interpolation of image with a small operation amount as well as obtain an image with sharpness.

The image processing recording medium according to a sixth aspect provides an image processing recording medium according to claim 3 in which the pixel selection process is one which selects data A of the pixel of interest of the low-resolution image, located at a position closest to a pixel for interpolation to be newly created (hereinafter, referred to as "new pixel") between pixels of the low-resolution image having distances of "1" between adjacent pixels, data B of upper pixel of the low-resolution image adjacent the pixel of interest at upper side thereof, data C of lower pixel of the low-resolution image adjacent the pixel of interest at lower side thereof, data D of left pixel of the low-resolution image adjacent the pixel of interest at left side thereof, and data E of right pixel of the low-resolution image adjacent the pixel of interest at right side thereof, and the new pixel data calculation process is one which calculates data F of new pixel composing the high-resolution image by a formula of F=A+(i/2)(E−D)+(j/2)(C−B) on the basis of data A of pixel of interest, data B of upper pixel, data C of lower pixel, data D of left pixel, data E of right pixel, the position of the new pixel (i, j) which is represented by a distance "i" in the horizontal direction and a distance "j" in the vertical direction from the pixel of interest to the new pixel.

According to the image processing program recording medium of the sixth aspect of the present invention, it is possible to carry out an interpolation of image with a small operation amount as well as obtain an image with sharpness.

The image processor according to a seventh aspect of the present invention provides an image processor according to the fourth aspect in which when generating the high-resolution image having twice number of pixels in each of the horizontal and vertical direction for the low-resolution image, the position of new pixel is set by making the absolute value of the distance "i" in the horizontal direction and that of the distance "j" in the vertical direction from the pixel of interest be ¼, respectively, and the new pixel data calculating means is one which, when calculating data F1, F2, F3 and F4 of the new pixel located at upper left, upper right, lower left, lower right of the pixel of interest, respectively, by F−A+(i/2)(ED)+(j/2)(C−B), previously calculates X=(i/2)(E−D) and Y=(j/2)(C−B) and then calculates F1=A−X−Y, F2=A+X−Y, F3=A−X+Y, and F4=A+X+Y.

According to the image processor of the seventh aspect of the present invention having the above-described construction, it is possible to provide an image processor in which, when interpolating the image to twice number in the horizontal direction and the vertical direction, can make the appearance probability of error of pixel data uniform and further realize the interpolation with a small operation amount and obtain the image with sharpness.

The image processing method according to an eighth aspect provides an image processing method according to the fifth aspect in which when generating the high-resolution image having twice number of pixels in both the horizontal and vertical direction for the low-resolution image, the position of new pixel is set by making the absolute values of the distance "i" in the horizontal direction and the distance "j" in the vertical direction from the pixel of interest be ¼, respectively, and the new pixel data calculating process is one which, when calculating data F1, F2, F3 and F4 of the new pixel located at upper left, upper right, lower left, lower right of the pixel of interest, respectively, by F=A+(i/2)(ED)+(j/2)(C−B), previously calculates X=(i/2)(E−D) and Y=(j/2)(C−B) and then calculates F1=A−X−Y, F2=A+X−Y, F3=A−X+Y, and F4=A+X+Y.

According to the image processing method of the eighth aspect of the present invention having the above-described construction, it is possible to provide an image processing method which can, when interpolating the image to twice number both in the horizontal direction and the vertical direction, make uniform the appearance probability of error of pixel data, and further, can realize the interpolation with a small operation amount and can obtain the image with sharpness.

The image processing program recording medium according to a ninth aspect of the present invention provides an image processing recording medium according to the sixth aspect, in which when generating the high-resolution image having twice number of pixels in both the horizontal and vertical direction for the low-resolution image, the position of new pixel is made by setting the absolute values of the distance "i" in the horizontal direction and the distance "j" in the vertical direction from the pixel of interest be ¼, respectively, and the new pixel data calculating process is one which, when calculating data F1, F2, F3 and F4 of the new pixel located at upper left, upper right, lower left, lower right of the pixel of interest, respectively, by F=A+(i/2)(ED)+(j/2)(C−B), previously calculates X=(i/2)(E−D) and Y=(j/2)(C−B) and then calculates F1=A−X−Y, F2=A+X−Y, F3=A−X+Y, and F4=A+X+Y.

According to the image processing program recording medium of the ninth aspect of the present invention having the above-described construction, it is possible to provide an image processing program recording medium which has recorded a program therein which program, when interpolating the image twice number in the horizontal direction and the vertical direction, can make uniform the appearance probability of error of pixel data, and further, can realize the interpolation with a small operation amount and can obtain the image with sharpness.

The image processor according to a tenth aspect provides an image processor according to the first aspect in which the pixel selection means is one which selects data A of pixel of interest located at a position closest to a pixel for interpolation to be newly generated (hereinafter, simply referred to as "new pixel") between pixels of low-resolution image having a distance between adjacent pixels being "1", data B of upper pixel of low-resolution image adjacent at upper side of the pixel of interest, data C of lower pixel of low-resolution image adjacent at lower side of the pixel of interest, and the new pixel data calculation means is one which calculates data F of the new pixel by a formula of F=A+(j/2)(C−B) on the basis of the data A of pixel of interest, data B of upper pixel, data C of lower pixel and the distance "j" in the vertical direction from the pixel of interest to the new pixel.

According to the image processor of the tenth aspect of the present invention having the above-described construction, it is possible to provide an image processor which can interpolate an image in the vertical direction with less operation amount and which can obtain a high-quality image with sharpness.

The image processing method according to an eleventh aspect of the present invention provides an image processing method according to the second aspect in which the pixel selection process is one which selects data A of pixel of interest located at a position closest to a pixel for interpolation to be newly generated (hereinafter, simply referred to as "new pixel") between pixels of low-resolution image having a distance between adjacent pixels being "1", data B of upper pixel of low-resolution image adjacent at upper side of the pixel of interest, data C of lower pixel of low-resolution image adjacent at lower side of the pixel of interest, and the new pixel data calculation process is one which calculates data F of the new pixel by a formula of F=A+(j/2)(C−B) on the basis of the data A of pixel of interest, data B of upper pixel, data C of lower pixel, and the distance "j" in the vertical direction from the pixel of interest to the new pixel.

According to the image processing method of the eleventh aspect of the present invention having the above-described construction, it is possible to obtain an image processing method which can interpolate an image in the vertical direction with a less operation amount and which can obtain a high-quality image with sharpness.

The image processing program recording medium according to a twelfth aspect of the present invention provides an image processing program recording medium according to the third aspect in which the pixel selection process is one which selects data A of pixel of interest located at a position closest to a pixel for interpolation to be newly generated (hereinafter, simply referred to as "new pixel") between pixels of low-resolution image having a distance between adjacent pixels being "1", data B of upper pixel of low-resolution image adjacent at upper side of the pixel of interest, data C of lower pixel of low-resolution image adjacent at lower side of the pixel of interest, and the new pixel data calculation process is one which calculates data F of the new pixel by a formula of F=A+(j/2)(C−B) on the basis of the data A of pixel of interest, data B of upper pixel, data C of lower pixel and the distance "j" in the vertical direction from the pixel of interest to the new pixel.

According to the image processing program recording medium of the twelfth aspect of the present invention having the above-described construction, it is possible to obtain an image processing program recording medium which having recorded a program therein, which program can interpolate an image in the vertical direction with a less operation amount and which can obtain a high-quality image with sharpness.

The image processor according to a thirteenth aspect of the present invention provides an image processor according to the tenth aspect in which when generating the high-resolution image having twice number of pixels in the vertical direction for the low-resolution image, the position of new pixel is made by setting the absolute value of the distance "j" in the vertical direction from the pixel of interest be ¼, and the new pixel data calculation means is one which, when calculating data F5 and F6 of new pixel which are adjacent at upper and lower of the pixel of interest, respectively, by a formula of F=A+(j/2)(C−B), calculates Y=(j/2)(C−B) previously, and then calculates F5=A−X and F6=A+Y.

According to the image processor of a thirteenth aspect of the present invention having the above-described construction, it is possible to provide an image processor which can, in interpolating an image to twice in the vertical direction, make uniform appearance probability of error of pixel data, perform interpolation with a less operation amount and obtain a high-quality image with sharpness.

The image processing method according to a fourteenth aspect of the present invention provides an image processing method according to the eleventh aspect in which, when generating high-resolution image having twice number of pixels in the vertical direction for said low-resolution image, the position of new pixel is made have the absolute value of a distance "j" in the vertical direction from the pixel of interest being ¼, and the new pixel data calculation process is one which, when calculating the data F5 and F6 of the new pixel located at upper and lower of the pixel of interest, respectively, by a formula of F=A+(j/2)(C−B), previously calculates Y=(j/2)(C−B), and then calculates F5=A−X and F6=A+Y.

According to the image processing method of the fourteenth aspect of the present invention having the above-described construction, it is possible to provide an image processing method which, in interpolating an image to twice in the vertical direction, can make uniform appearance probability of error of pixel data, and can perform interpolation with a less operation amount and obtain a high-quality image with sharpness.

The image processing program recording medium according to a fifteenth aspect of the present invention provides an image processing program according to the twelfth aspect in which, when generating the high-resolution image having twice number of pixels in the vertical direction for the low-resolution image, the position of the new pixel is made have the absolute value of a distance "j" in the vertical direction from the pixel of interest be ¼, and the new pixel data calculation process is one which, when calculating data F5 and F6 of the new pixel located at upper and lower of the pixel of interest respectively, by a formula of F=A+(j/2)(CB), previously calculates Y=(j/2)(C−B) and then calculates F5=A−X and F6=A+Y.

According to the image processing program recording medium of the fifteenth aspect of the present invention having the above-described construction, it is possible to provide an image processing program recording medium which, in interpolating an image to twice in the vertical direction, can make uniform appearance probability of error of pixel data, and can perform interpolation with a less operation amount and obtain a high-quality image with sharpness.

DETAILED DESCRIPTION OF THE INVENTION

Hereinafter, the present embodiment will be described by referring to the figures. The embodiments described herein are just examples and the present invention is not limited to these embodiments.

(Embodiment 1)

The image processor according to the first embodiment of the present invention is one in which conversion of a low-resolution image into a high-resolution image is carried out by performing interpolating by a simple configuration.

That is, a pixel of an original image that is closest to the position of a new pixel for interpolation is taken as a pixel of interest. The difference between adjacent pixel data which are pixels of the original image which are adjacent to each other and between the pixel of interest is obtained, and the result of multiplication of the ratio between the distance between the pixel of interest and the new pixel and the distance between the adjacent pixels and the difference is added to the pixel data of the pixel of interest, thereby generating the pixel data of the new pixel.

Figure 2:
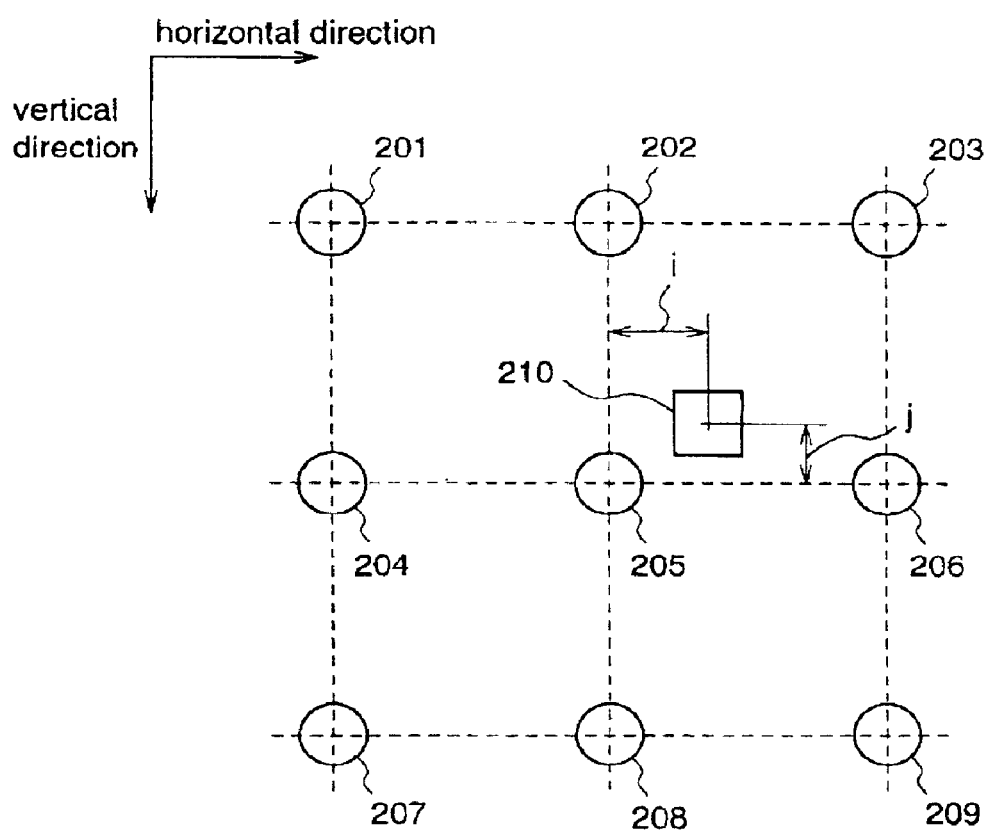
FIG. 2 is a diagram illustrating the position of a new pixel which is interpolated by the image processor according to the first embodiment of the present invention.

FIG. 2 is a diagram illustrating the position of the new pixel which is interpolated by the image processor according to the first embodiment of the present invention.

In FIG. 2, numerals 201 through 209 are original pixels adjacent to each other in the horizontal or vertical direction with a pixel interval of "1". Numeral 210 denotes a new pixel which is generated by interpolating a low-resolution image, whose intensity is represented by F. Numeral 205 denotes a pixel of interest which is the closest to new pixel 210, which has intensity A. Numerals 202, 208, 204 and 206 denote an upper pixel, a lower pixel, and a left pixel, respectively, which are adjacent to the pixel of interest 205, and are situated at an upper side, a lower side, a left-hand side, and a right-hand side, respectively, relative to the pixel of interest 205, and which are adjacent to the pixel of interest 205 and have intensity B, C, D and E, respectively. Further, "i" denotes the distance between pixel of interest 205 and new pixel 210 in the horizontal direction, and "j" presents the distance between pixel of interest 205 and new pixel 210 in the vertical direction, and right hand direction and downward direction are assumed to be positive.

The intensity F of new pixel 210 is calculated by the formula of $$F = A + (i/2)(E-D) + (j/2)(C-B).$$

Because the interpolation point is previously known in this formula, (i/2) and (j/2) can be provided as constants beforehand, and therefore, the number of times of operation required for calculating the intensity F requires two times of multiplication and four times of addition or subtraction for calculating the intensity F. On the contrary, the conventional linear interpolation requires six times of multiplication and five times of addition or subtraction for calculating the intensity of a new pixel. Thereby, the image processor according to the first embodiment of the present invention requires less calculation amount than the conventional linear interpolation.

Next, intensity F of new pixel 210 will be briefly described by taking the horizontal direction of FIG. 2 as an example.

Figure 5:
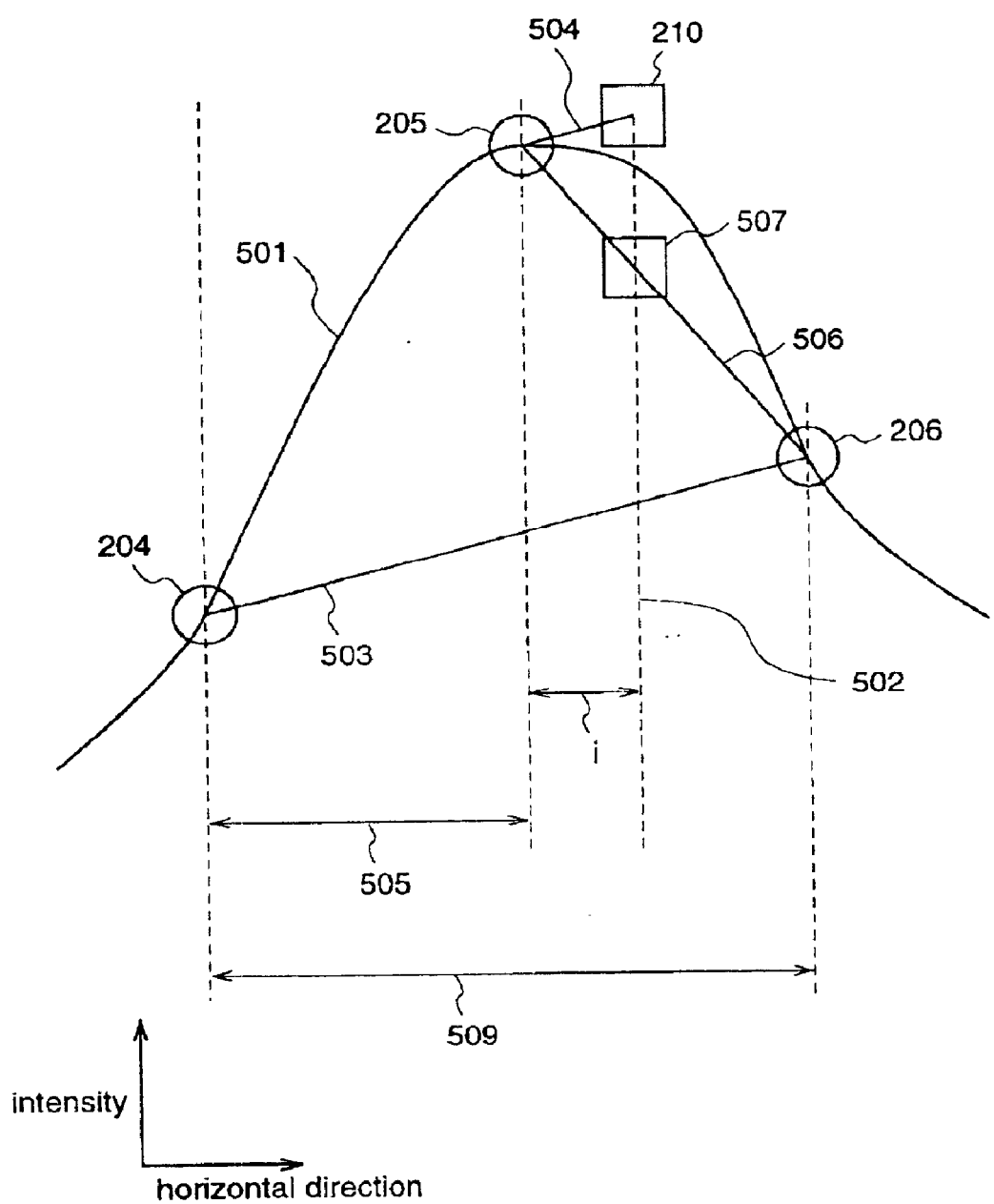
FIG. 5 is a diagram illustrating the intensity of new pixel which is interpolated by the image processor according to the first embodiment of the present invention.
Figure 6:
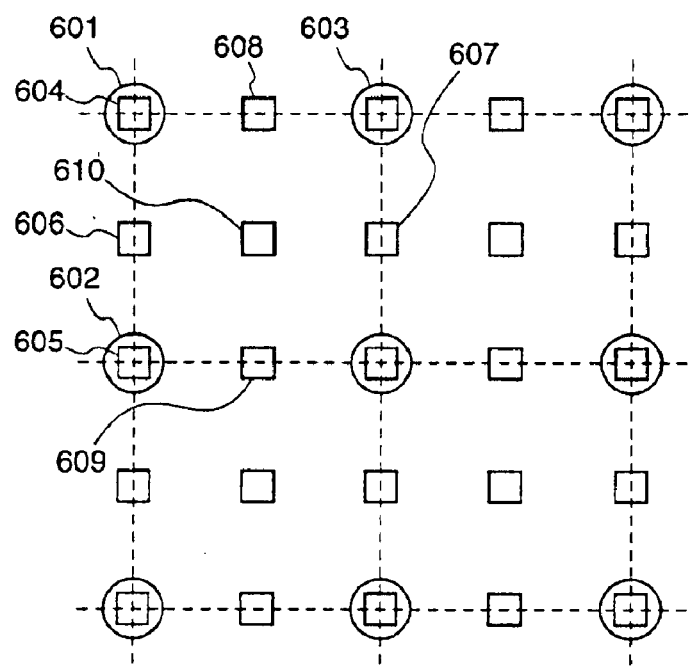
FIG. 6 is a diagram illustrating the pixel arrangement when the conventional image processing method performs resolution conversion to twice the number of pixels in the horizontal and vertical directions, respectively.

FIG. 5 is a diagram illustrating the intensity of the new pixel which is interpolated by the image processor according to the first embodiment of the present invention.

Here, a simple assumption is taken for interpolating. Hereinafter, the assumption will be described by referring to FIG. 5. FIG. 5 is a diagram illustrating an image interpolation model. For simplification, the image is represented in one-dimension and broadening of an image is presented in the horizontal direction while intensity of the image is presented in the vertical direction.

In FIG. 5, the ordinate represents an intensity and the abscissas represents the distance in the horizontal direction in FIG. 2. Numerals 204, 205, 206, 210 and i denote the same elements as shown in FIG. 2. Numeral 501 denotes an intensity curved line (actually, intensity curved plane) of a low-resolution image, 502 denotes a line representing positions which are apart only by the distance "i" from a pixel of interest 205, 503 denotes a line connecting an original pixel 204 and an original pixel 206, 504 denotes a line which is parallel with line 503 and connects a pixel of interest 205 and a new pixel 210, 505 denotes the pixel interval of a low-resolution image, 506 denotes a line connecting a pixel of interest 205 and an original pixel 206, 507 denotes a crossing point of line 502 and line 506, which is a new pixel interpolated by the conventional linear interpolation. Further, numeral 509 denotes the distance between original pixel 204 and original pixel 206.

In order to clarify the difference with the conventional linear interpolation, the intensity D, A and E of original pixels 204, 205 and 206 are assumed to be D<E<A.

When numeral 501 denotes an original intensity curved line of an image, it is assumed that original image pixels are sampled at even intervals in the horizontal direction such as 204, 205 and 206. At this time, the interpolation data at the interpolated points on a straight line 502 are assumed to be obtained.

As a reference, in a case where linear interpolation is performed, the crossing point of straight line 506 connecting pixel 205 and pixel 206 and straight line 502 becomes an interpolation data. In contrast thereto, the intersection point of a tangent of intensity curved line at the position of pixel 205 and straight line 502 is assumed to be an interpolation data in the first embodiment of the present invention. Further, approximately, the gradient of a tangent at pixel 205 is assured to be equal to the gradient of straight line 503 connecting pixel 204 and pixel 206. According to this assumption, the straight line 504 having the same inclination as the straight line 503, and which passes through the pixel 205 can be obtained, and further, new pixel 210 as interpolated data can be obtained at the crossing point of the straight line 504 and the straight line 502.

By assuming as above, the process is actually performed such that the intensity of the pixel 204 is subtracted from that of the pixel 206, the result is multiplied by a ratio between the distance "i" and the distance 509, and the result is added to the intensity of pixel 205. Thereby, it becomes possible to obtain an interpolation result by quite an easy processing.

In order to produce an actual formula, when the intensity of pixel 204 is assumed to be "D", the intensity of pixel 205 be "A", the intensity of pixel 206 be "E", the distance 509 be "2" (=twice as the interval of abutted pixels "1") and the distance 510 be "i", the intensity F of the pixel 210 is given by $$F=A+(i/2)(E-D),$$

which is quite a simple formula requiring only one time multiplication and two times addition or subtraction.

As shown in FIG. 5, while the intensity of new pixel 507 which is interpolated by the conventional linear interpolation amounts to the average of intensity A and E, the image processor according to the first embodiment can obtain a high-quality image with sharpness since the intensity of new pixel 210 which is interpolated by the image processor is not limited to be between the intensity A and F.

Figure 11:
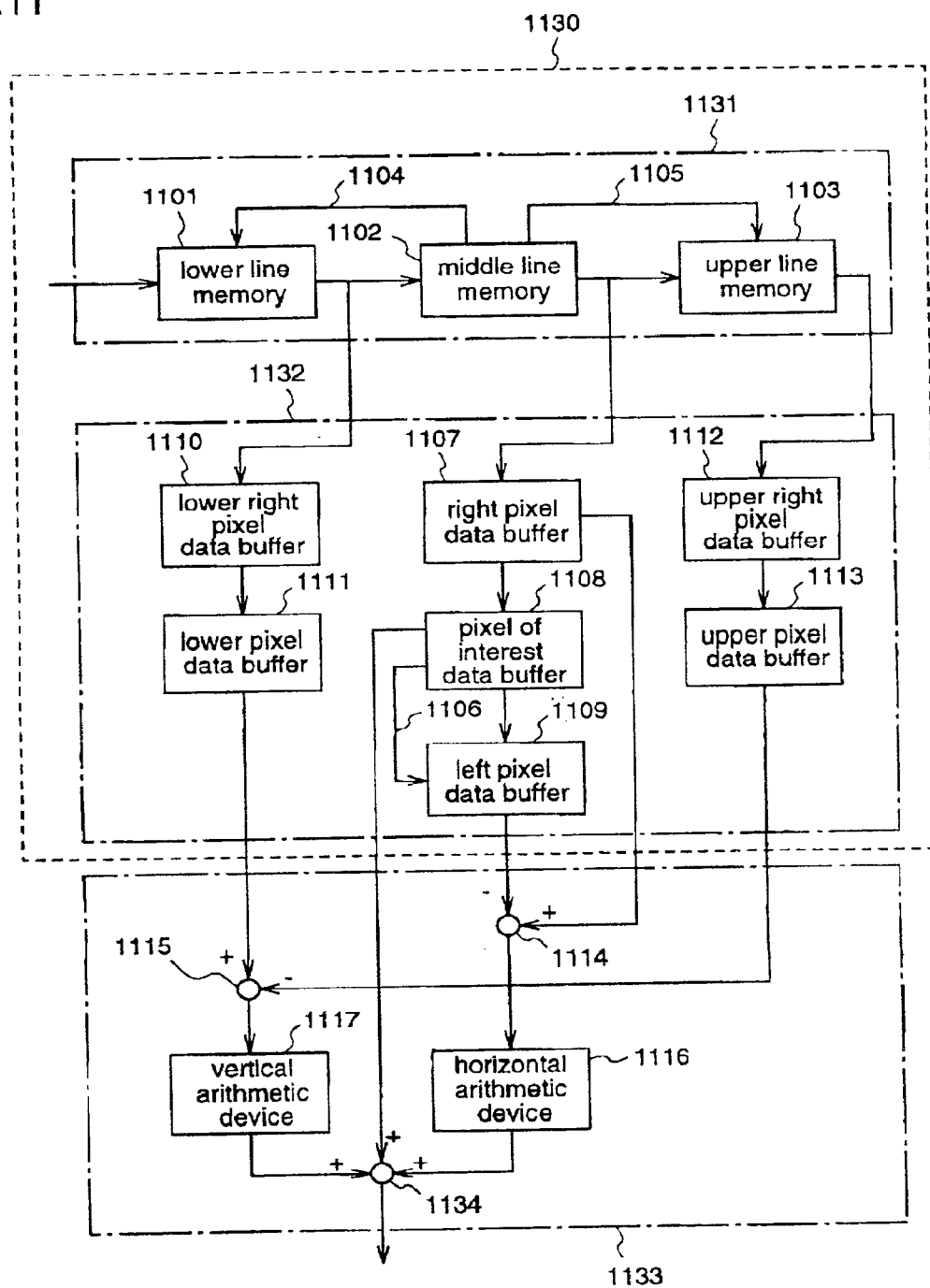
FIG. 11 is a block diagram showing the construction of the image processor according to the first embodiment of the present invention.

FIG. 11 is a block diagram showing the construction of the image processor according to the first embodiment.

In FIG. 11, numeral 1131 denotes a line memory means which is configured as follows.

To be specific, numeral 1101 denotes a lower line memory which receives as its input a low-resolution image sequentially from an original pixel data at an upper end of a frame, 1102 denotes a middle line memory which receives as its input the output of lower line memory 1101, and 1103 denotes an upper line memory which receives as its input the output of middle line memory 1102. Each line memory has a storage capacity for storing the original pixels of low-resolution image up to 1 line in the horizontal direction, and it outputs the oldest data of 1 pixel among stored data if one pixel data is input when the memory storage is filled. Further, 1105 denotes an upper end processing path for copying instantaneously the data which is stored in the middle line memory 1102 to the upper line memory 1103 at the frame upper end processing, and 1104 denotes a lower end processing path for instantaneously copying the data which is stored in the middle line memory 1102 to the lower line memory 1101 at the frame lower end processing.

Further, numeral 1132 denotes a data buffer means that is configured as follows.

To be specific, numeral 1107 denotes a right pixel data buffer, 1108 denotes a pixel of interest data buffer, 1109 denotes a left pixel data buffer, 1110 denotes a lower right pixel data buffer, 1111 denotes a lower pixel data buffer, 1112 denotes an upper right pixel data buffer, and 1113 denotes an upper pixel data buffer. Each data buffer is a storage capacity for storing a data of 1 pixel temporarily, and outputs the data which is stored beforehand when the data of 1 pixel is input. Further, numeral 1106 denotes a left end processing path for copying instantaneously the data which is stored in the pixel of interest data buffer 1108 to the left pixel data buffer 1109 at a frame left end processing.

Further, numeral 1130 denotes a pixel selection means that is constructed by the line memory means 1131 and the data buffer means 1132.

Further, numeral 1133 denotes a new pixel data arithmetic means for obtaining the data of a new pixel that is constructed as follows.

To be specific, numeral 1114 denotes a horizontal subtracter for obtaining the difference in the horizontal direction, 1115 denotes a vertical subtracter for obtaining the difference in the vertical direction, 1116 denotes a horizontal arithmetic device for obtaining the correction value in the horizontal direction, 1117 denotes a vertical calculator for obtaining the correction value in the vertical direction, and 1134 denotes a new pixel data calculator for obtaining the data of new pixel.

Hereinafter, the distance from a pixel of interest to a new pixel will be described by one dimension for simplification.

Figure 3:
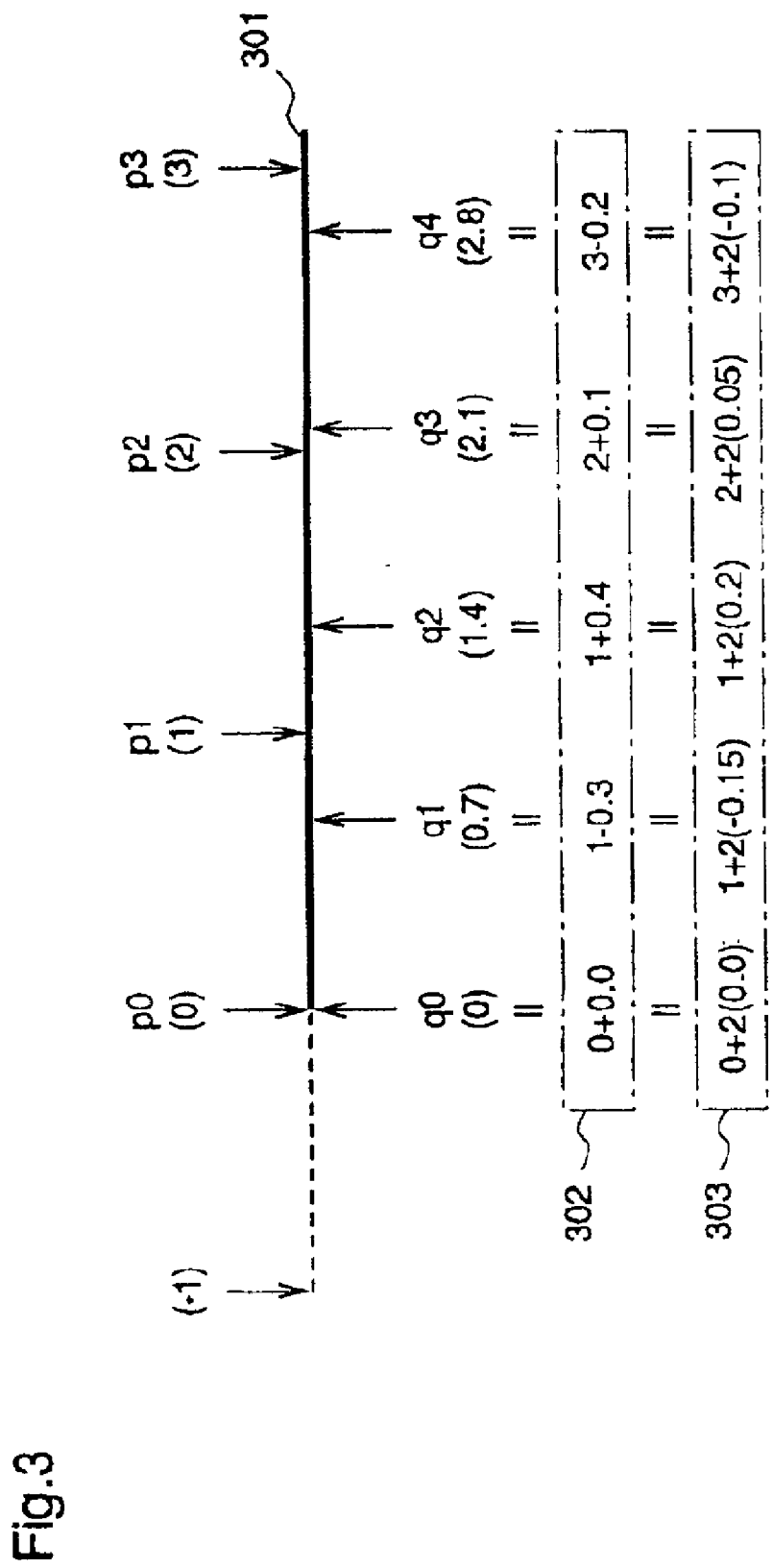
FIG. 3 is a diagram showing the position of a new pixel in a case where 700 pieces of original pixels in 1 line are interpolated by 1000 new pixels.
Figure 4:
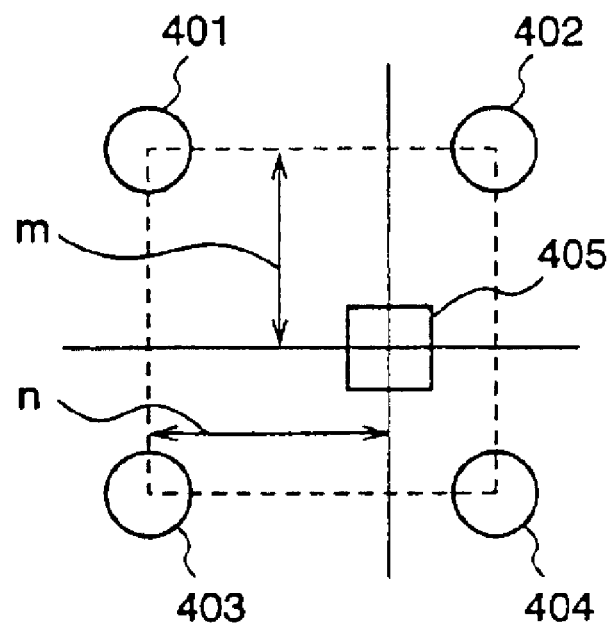
FIG. 4 is a diagram illustrating the interpolation position of pixels according to the conventional linear interpolation.

FIG. 3 is a diagram illustrating the position of a new pixel in a case where 700 pieces of original pixels in one line are interpolated by 1000 pieces of new pixels.

In FIG. 3, numeral 301 denotes an axis representing a horizontal direction of the frame, and p0, p1, p2 and p3 denote original pixels which represent the positions on the axis 301 by employing an arrow, respectively, and assumes the pixel interval to be "1". The q0, q1, q2 and q3 denote new pixels which represent the positions on the axis 301 employing an arrow, respectively. Each figure in parantheses is a pixel position which is represented by the distance from the original pixel p0.

Numeral 302 denotes the position of a new pixel which is represented by a form dividing the distance from the original pixel p0 into an integral part and a decimal part, and the integral part represents the position of a pixel of interest against the new pixel and the decimal part represents the distance from a pixel of interest to the new pixel in such a manner that the absolute value of the decimal part does not exceed a threshold of 0.5. For instance, new pixel q3 has a distance from the original pixel p0 of 2.1, and dividing the same into an integral part and a decimal part not exceeding 0.5, results in 2+0.1, which means the pixel of interest against new pixel q3 is the original pixel p2, and the distance from the original pixel p2 to new pixel q3 is 0.1. Further, new pixel q1 has a distance from the original pixel p0 of 0.7, and dividing the same into an integral part and a decimal part not exceeding 0.5, results in 1-0.3, which means the pixel of interest against new pixel q1 is the original pixel p1 and the distance from the original pixel p1 to new pixel q1 is −0.3.

Numeral 303 denotes the position of a new pixel, which is represented by scaling the decimal part of the position 302 into ½. In the actual interpolation calculation, the distance "i" and "j" from the pixel of interest to the new pixel is scaled into ½ to be employed for the calculation, the decimal part is scaled into ½ beforehand, and the integral part and the decimal part are divided with the absolute value of the decimal part not exceeding a threshold of 0.25. Further, the threshold value is obtained by multiplying 0.5 on the size of scaling.

Hereinafter, the operation of line memory means 1131 and data buffer means 1132 will be described.

Firstly, the basic operation will be described. This is a case where frame end processing (described later) is not related.

When it has no relation to frame end processing, the line memory means 1131 and the data buffer means 1132 stores data of each full storage capacity.

Here, the lower line memory 1101 receives as its input data of 1 pixel from the outside and outputs the oldest data of 1 pixel among stored data to the middle line memory 1102 and the lower right pixel data buffer 1110. Further, the middle line memory 1102 receives as its input the data of 1 pixel from the lower line memory 1101 and outputs the oldest data of 1 pixel among stored data to the upper line memory 1103 and the right pixel data buffer 1107. Further, the upper line memory 1103 receives as its input the data of 1 pixel from the middle line memory 1102 and outputs the oldest data of 1 pixel among stored data to the upper right pixel data buffer 1112.

Further, the lower right pixel data buffer 1110 receives as its input the data of 1 pixel from the lower line memory 1101 and outputs the data of 1 pixel to the lower pixel data buffer 1111. Further, the lower pixel data buffer 1111 receives as its input the data of 1 pixel from the lower right pixel data buffer 1110 and outputs the data of 1 pixel to the vertical subtracter 1115.

Further, the right pixel data buffer 1107 receives as its input the data of 1 pixel from the middle line memory 1102 and outputs the data of 1 pixel to the pixel of interest data buffer 1108 and the horizontal subtracter 1114. Further, the pixel of interest data buffer 1108 receives as its input the data of 1 pixel from the right pixel data buffer 1107 and outputs the data of 1 pixel to the left pixel data buffer 1109 and new pixel data calculator 1134. The left pixel data buffer 1109 receives as its input the data of 1 pixel from the pixel of interest data buffer 1108 and outputs the data of 1 pixel to the horizontal subtracter 1114.

Further, the upper right pixel data buffer 1112 receives as its input the data of 1 pixel from the upper line memory 1103 and outputs the data of 1 pixel to the upper pixel data buffer 1113. The upper pixel data buffer 1113 receives as its input the data of 1 pixel from the upper right pixel data buffer 1112 and outputs the data of 1 pixel to the vertical subtracter 1115.

Accordingly, if the data of a pixel can be obtained by scanning 1 line from the left-hand side toward the right-hand side of the image and each line sequentially from the upper side toward the lower side of the image, the highest line among three lines could be stored in the upper line memory 1103 in which a line data which is first input is stored among three line memories 1101, 1102 and 1103, the highest line among three lines is stored among three lines is stored. In addition, in the upper right pixel data buffer 1112 in which the pixel data which is first input is stored among two data buffers 112 and 1113, the pixel data which is positioned at the left-side among two pixel data is stored.

Accordingly, in the data buffer 1107 or 1113 in the data buffer means 1132 in FIG. 11, a right pixel, a pixel of interest, a left pixel, a right lower pixel, a lower pixel, an upper right pixel and an upper pixel are stored with locating the pixel of interest data buffer 1108 at their center. Thereby, the storing of pixel arrangement shown in FIG. 2 is realized.

Hereinafter, four frame end processing will be described.

Firstly, the operation of frame upper end processing will be described.

Since there is no pixel which is adjacent the pixel of interest at the upper side thereof in a case where a pixel of interest is a pixel of a frame upper end, the frame upper end processing performs pixel interpolation by copying the data of pixel of interest thereto. Further, the frame upper end processing performs, when the lower line memory 1101 receives the vertical synchronous signal indicating the beginning of a frame, the following operation.

When the data of a pixel on the second line is input after storing all pixel data of the first one line, the lower line memory 1101 outputs stored pixel data of the first one to the middle line memory 1102 without outputting to the right pixel data buffer 1110. Then, the lower line memory 1101 stores all pixel data of the second line, and the middle line memory 1102 stores all pixel data of the first line.

Then, the upper end processing path 1105 copies all pixel data of the second line which is stored in the middle line memory 1102 to the upper line memory 1103. The upper line memory 1103 stores all pixel data of the first line, and thereafter, the line memory means 1131 performs a basic operation.

Secondly, a frame lower end processing will be described.

Since there is no pixel which is adjacent to the pixel of interest at the lower side thereof in a case where the pixel of interest is a pixel of a frame lower end, the frame lower end processing performs pixel interpolation by copying the data of a pixel of interest thereto. Further, the frame lower end processing performs, when the lower line memory 1101 receives a vertical synchronous signal indicating the end of a frame.

The lower line memory 1101 which receives as its input the data of a pixel of the last line output stored data of a pixel of the last line one by one pixel during the vertical synchronous signal. Thereafter, the data which is stored in the lower line memory 1101 is lost, and the middle line memory 1102 stores all pixel data of the last line.

The lower end processing path 1104 copies the pixel data of the last line which is stored in the middle line memory 1102 to the lower line memory 1101. Then, the lower line memory 1101 stores the pixel data of the last line, and thereafter, the line memory means 1131 performs a basic operation.

Thirdly, a frame left end processing will be described.

The frame left end processing performs, when the pixel of interest is a pixel of a frame left end which has no pixel adjacent to the pixel of interest at a left side thereof, pixel interpolation by copying the data of a pixel of interest thereto. Further, the front left end processing performs, when the pixel of interest data buffer 1108 receives a horizontal synchronous signal indicating the beginning of the line, the following operation.

The pixel of interest data buffer 1108 which received a horizontal synchronous signal indicating the beginning of the line stores the data of the first pixel. Next, the left end processing path 1106 copies the data of the first pixel which is stored in the pixel of interest data buffer 1108 to the left pixel data buffer 1109. Then, the left pixel data buffer 1109 stores the first pixel data of each line, and thereafter, the data buffer means 1132 performs a basic operation.

Fourthly, a frame right end processing will be described.

The frame right end processing performs, when the pixel of interest is a pixel of a frame right end which has no pixel adjacent to the pixel of interest at a right side thereof, pixel interpolation by copying the data of a pixel of interest thereto. Further, the frame end processing performs, when the lower line memory 1101 receives a horizontal synchronous signal indicating the end of the line, the following operation.

Due to the line memory means 1131 not shifting data during the horizontal synchronous signal indicating the end of the line, the data would not be shifted from the line memory means 1131 to the data buffer means 1132.

Here, the right pixel data buffer 1107 copies the stored pixel data of the line end to the pixel of interest data buffer 1108, and the lower right pixel data buffer 1110 and the upper right pixel data buffer 1112 output stored pixel data of the line end to the lower pixel data buffer 1111 and the upper pixel data buffer 1113, respectively. Both the right pixel data buffer 1107 and the pixel of interest data buffer 1108 can store the data of the pixel of interest at the right end of the frame, and the left pixel data buffer 1109 can store the pixel data which is adjacent to the pixel of interest at the left side thereof, and the upper pixel data buffer 1113 and the lower pixel data buffer 1111 can store the pixel data which is adjacent to the pixel of interest at the upper and the lower side thereof, respectively, and thereafter, the line memory means 1131 and the data buffer means 1132 performs basic operations.

According to these four frame end processing, even when a pixel of interest is situated at the end part of flame which does not have an adjacent pixel at any side of the pixel of interest, the adjacent pixel value could be filled with the value of a pixel of interest, thereby resulting in a capability of calculating new pixel data.

In this way, the line memory means 1131 and the data buffer means 1132 can store the data of pixel of interest into the pixel of interest data buffer 1108 and store the data of pixels which are adjacent to the upper, the lower, the left side, and the right side of the target pixel into the upper pixel data buffer 1113, the lower pixel data buffer 1111, the left pixel data buffer 1109 and the right pixel data buffer 1107, respectively, by basic operations for shifting the data of a pixel which is input from the outside one by one, and four frame end processing.

Next, an operation of the arithmetic means 1133 will be described.

The horizontal subtracter 1114 receives as its input the right pixel data from the right pixel data buffer 1107 and the left pixel data from the left pixel data buffer 1109, and subtracts the left pixel data from the right pixel data, and outputs the difference in the horizontal direction to the horizontal arithmetic device 1116. The horizontal arithmetic device 1116 multiples (coefficient ½), (the distance in horizontal direction from a pixel of interest to a new pixel) and (the difference in a horizontal direction), and outputs the horizontal correction value to new pixel data calculator 1134. The vertical subtracter 1115 receives as its inputs the lower pixel data from the lower pixel data buffer 1111 and the upper pixel data from the upper pixel data buffer 1113, and subtracts the upper pixel data from the lower pixel data, and outputs the difference in a vertical direction to the vertical arithmetic device 117. The vertical arithmetic device 1117 multiples (coefficient ½), (the distance in vertical direction from a pixel of interest to a new pixel) and (the difference in a vertical direction), and outputs the vertical correction value to new pixel data calculator 1134. The new pixel data calculator 1134 receives as its input the data of a pixel of interest from the pixel of interest data buffer 1108, and adds (the data of the pixel of interest), (horizontal correction value) and (vertical correction value), and output the new pixel data.

Next, an operation procedure of the operation means 1133 will be described by referring to FIG. 1.

Figure 1:
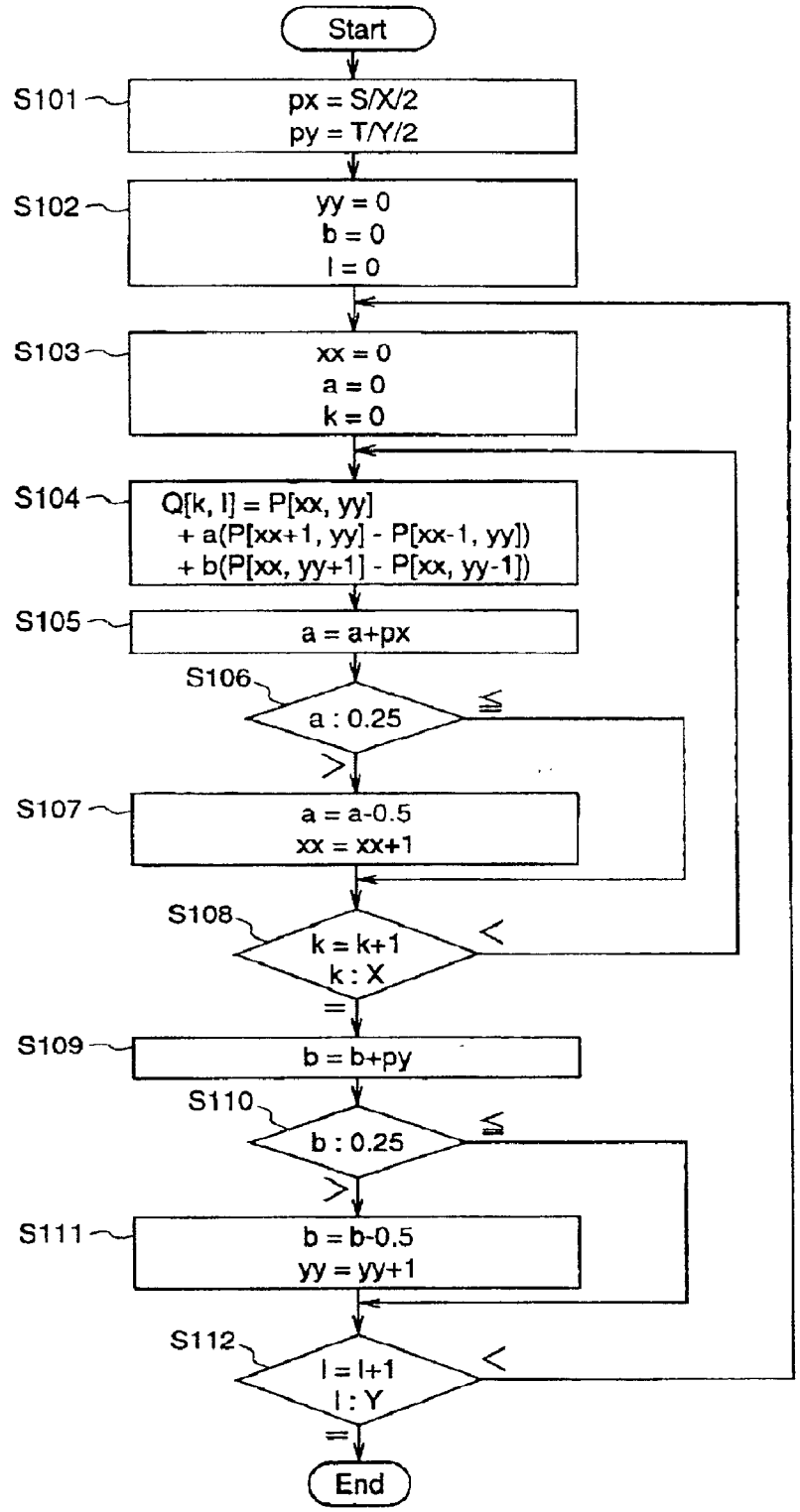
FIG. 1 is a flow chart showing an operation procedure of a calculation procedure of performing resolution conversion of S×T pixel image to X×Y pixel image in the image processor according to the first embodiment of the present invention.

FIG. 1 is a flow chart showing an operation procedure for performing resolution conversion of an image of S×T pixels to that of X×Y pixels.

In FIG. 1, S denotes a pixel number of a low-resolution image in the horizontal direction, T denotes a pixel number of a low-resolution image in the vertical direction, X denotes a pixel number of a high-resolution image in the horizontal direction, Y denotes a pixel number of a high-resolution image in the vertical direction, px denotes a horizontal pitch, py denotes a vertical pitch, yy denotes a position of pixel of interest in the vertical direction, b denotes a vertical coefficient, 1 denotes a vertical loop counter, xx denotes a position of a pixel of interest in the horizontal direction, a denotes a horizontal coefficient, k denotes a horizontal loop counter, Q[k,1] denotes an intensity at the position of new pixel [k,1], P[xx,yy] denotes an intensity at the position of original pixel [xx,yy], and there are relations of $0<S\leq X$, $0<T\leq Y, 0\leq k<X, 0\leq 1<Y, 0\leq xx<S$, and $0\leq yy<T$.

S101 denotes a pitch-calculating step for calculating the pitch of a new pixel in each of the horizontal and vertical directions. The horizontal pitch px is calculated by S/X/2, and the vertical pitch py is calculated by T/Y/2.

S102 denotes a vertical loop default setting up step for setting initial values for variables concerning the vertical loop, and it assigns the initial value "0" to the position yy in the vertical direction of the pixel of interest, the vertical coefficient b, and the vertical loop counter 1, respectively.

S103 denotes a horizontal loop default setting up step for setting initial values for variables concerning the horizontal loop, and it assigns the initial value "0" to the position xx in the horizontal direction of the pixel of interest, the horizontal coefficient a, and the horizontal loop counter k, respectively.

S104 denotes an intensity calculating step for calculating the intensity of the new pixel and the intensity of new pixel Q[k,1] is calculated by $$Q[k,1]=P[xx,yy]+a(P[xx+1,yy]-P[xx-1,yy])+b(P[xx,yy+1]-P[xx,yy-1]).$$

S105 denotes a horizontal coefficient calculating step for calculating a new horizontal coefficient, and it is calculated by adding the horizontal pitch px to the horizontal coefficient a.

S106 denotes a horizontal coefficient threshold comparison step for comparing the horizontal coefficient with a threshold value 0.25, and, in accordance with the comparison result, it proceeds to step S108 when the horizontal coefficient a is smaller than or equal to the threshold value, while it proceeds to step S107 when it is larger than the threshold value.

S107 denotes a pixel of interest right shifting step for shifting the pixel of interest toward the right direction, and the position of pixel of interest in the horizontal direction is shifted by xx=xx+1, and the horizontal coefficient is shifted by a=a−0.5.

S108 denotes a horizontal loop conclusion judging step for judging the conclusion of a horizontal loop which is repeated from step S104 through S108, and it compares new horizontal loop counter k which is obtained by adding 1 to the pixel number X in the horizontal direction of the high-resolution image, and, in accordance with the comparison result, it proceeds to step S104 when new horizontal loop counter k is smaller than X, while it proceeds to step S109 when it is equal to X.

S109 denotes a vertical coefficient-calculating step for calculating a new vertical coefficient, and it is calculated by adding the vertical pitch py to the vertical coefficient b.

S110 denotes a vertical coefficient threshold comparison step for comparing the vertical coefficient with threshold value 0.25, and, in accordance with the comparison result, it proceeds to step S112 when the vertical coefficient b is smaller than or equal to the threshold value, while it proceeds to step S111 when it is larger than the threshold value.

S111 denotes a pixel of interest downward shifting step for shifting the pixel of interest in a downward direction, and the position of the pixel of interest in the vertical direction is shifted by yy=yy+1, and the vertical coefficient is shifted by b=b−0.5.

S112 denotes a vertical loop conclusion judging step for judging the conclusion of a vertical loop which is repeated from step S103 through S112, and it compares new vertical loop counter 1, which is obtained by adding "1," to the vertical loop counter 1, with the pixel number Y in vertical direction of high-resolution image, and, in accordance with the comparison result, it proceeds to step S103 when new vertical loop counter 1 is smaller than Y, while it terminates pixel interpolation of an image when it is equal to Y.

In the image processor according to the first embodiment of the invention, the image processor for converting a low-resolution image to a high-resolution image by interpolating the low-resolution image includes a pixel selection means 1130 for extracting a pixel of interest, an upper pixel, a lower pixel, a left pixel and a right pixel, the vertical subtracter 1115 for calculating the difference in the vertical direction on the basis of the upper and lower pixel data, the horizontal subtracter 1114 for calculating the difference in the horizontal direction on the basis of the left and right pixel data, the vertical arithmetic device 1117 for calculating the vertical correction value on the basis of the difference in the vertical direction and the distance from a pixel of interest to a new pixel in the vertical direction, the horizontal arithmetic device 1116 for calculating the horizontal correction value on the basis of the difference in the horizontal direction, and the distance from a pixel of interest to a new pixel in the vertical direction, and the new pixel data calculator 1134 for calculating the new pixel data on the basis of data of a pixel of interest, the vertical correction value, and the horizontal correction value, and further, the intensity F is calculated by $F=A+(i/2)(E-D)+(j/2)(C-B)$ on the basis of intensity A of the pixel of interest, the intensity B of the upper pixel, the intensity C of the lower pixel, the intensity D of the left pixel, the intensity E of the right pixel and the position (i, j) of the new pixel. Thereby, it is possible to reduce an operation amount for interpolating images and to improve the processing speed, and further, a high-quality image with sharpness is obtained without smoothing an edge part of image.

(Embodiment 2)

The image processor according to a second embodiment is one which converts a low-resolution image of horizontal 320×vertical 240 pixels to a high-resolution image of horizontal 640×vertical 480 pixels by interpolating to twice the number of pixels in each of the horizontal and vertical directions, and one which is limited to interpolation to twice the number in the vertical and horizontal directions which are well employed in resolution conversion processing so as to suppress an arithmetic operation amount to the minimum.

Figure 12:
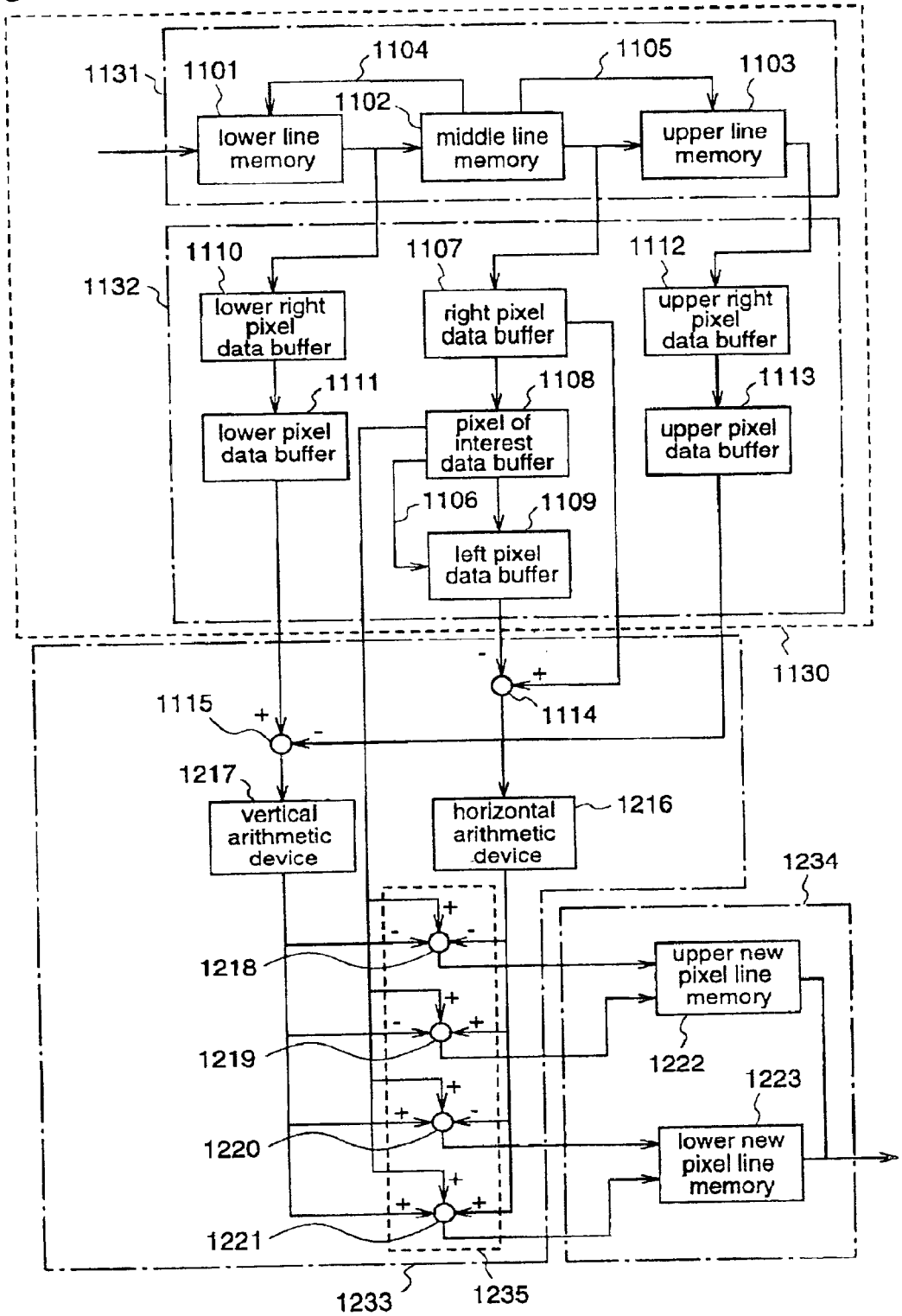
FIG. 12 is a block diagram showing the construction of the image processor according to the second embodiment of the present invention.

FIG. 12 is a block diagram showing the construction of the image processor according to the second embodiment.

In FIG. 12, like reference characters as FIG. 11 designate the same parts, 1233 denotes new pixel data arithmetic means and is constructed as follows.

To be specific, 1114 and 1115 denote the same elements as those in FIG. 11, 1216 denotes a horizontal arithmetic device for obtaining the horizontal correction value by shifting the difference in the horizontal direction leftward by 3 bits so as to make the same to ⅛, 1217 denotes a vertical arithmetic device for obtaining the vertical correction value by shifting the difference in the vertical direction by 3 bits so as to make to ⅛, 1218 denotes an upper left new pixel data calculator for calculating the data of a new pixel for interpolation at an upper left of a pixel of interest, 1219 denotes an upper right new pixel data calculator for calculating the data of the new pixel for interpolation at an upper right of the pixel of interest, 1220 denotes a lower left new pixel data calculator for calculating the data of the new pixel for interpolation at a lower left of the pixel of interest, 1221 denotes a lower right new pixel data calculator for calculating the data of the new pixel for interpolation at a lower right of the pixel of interest. Further, 1235 denotes a new pixel data calculator which is constructed by the upper left new pixel data calculator 1218, the upper right new pixel data calculator 1219, the lower left new pixel data calculator 1220, and the lower right new pixel data calculator 1221.

Further, 1234 is a maintenance means, and is constructed as follows.

1222 denotes an upper new pixel line memory for storing the data of the new pixel which is situated at the upper of the pixel of interest by 1 line of high-resolution image, 1223 denotes a lower new pixel line memory for storing the data of new pixel which is situated at the lower of the pixel of interest by 1 line of high-resolution image.

Figure 7:
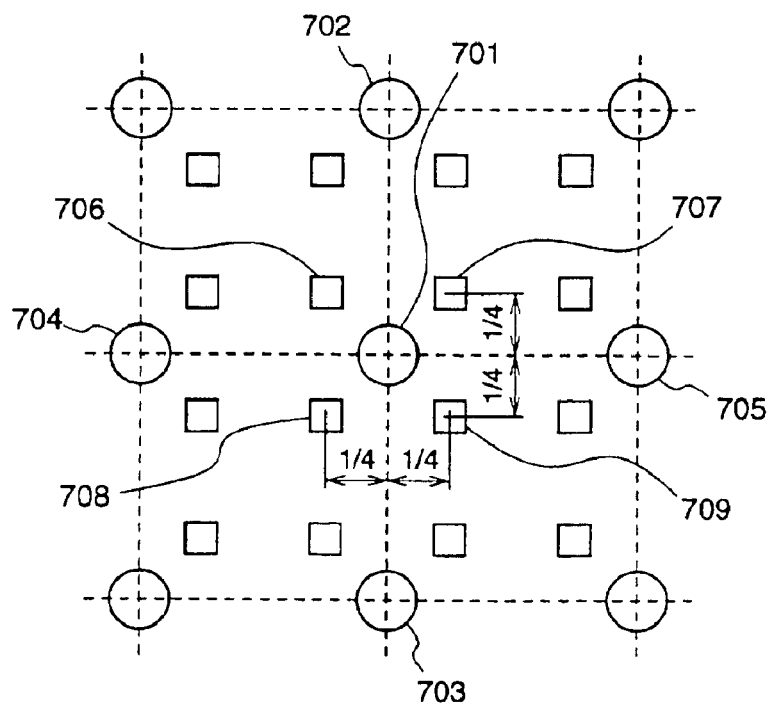
FIG. 7 is a diagram illustrating the position of a new pixel interpolated by the image processor according to the second embodiment of the present invention.

FIG. 7 is a diagram illustrating the position of the new pixel which is interpolated by the image processor according to the embodiment of the present invention.

In FIG. 7, "○" denotes an original pixel of low-resolution image having a pixel interval of "1", "□" denotes a new pixel of high-resolution image. Further, new pixels do not match with the position of the original pixel, but are positioned at points which are distant from the original pixels by the distances the absolute values of which are ¼ in both the horizontal and vertical directions. The intensity of the original pixels of 701,702,703,704 and 705 and the new pixels of 706,707,708,709 are designated as P701, P702, P703, P704, P705, Q706, Q707, Q708 and Q709, respectively.

According to this pixel arrangement, since all the new pixels are arranged at equal intervals from the original pixels, the appearance probability of the error of pixel data becomes uniform. However, in this arrangement, the operation amount will increase because it is necessary to create all of the new pixels. In this second embodiment, utilizing the nature that the distances from the original pixel are all equal, the calculation amount can be suppressed.

To be specific, if difx=(⅛)(P705−P704), difx=(⅛)(P703−P702) are first calculated on the basis of original pixels 701, 702, 703, 704 and 705, the arithmetic expression for calculating the intensity of new pixels Q706, Q707, Q708, Q709, becomes as follows, $Q706 = P701 - difx - dify$ $Q707 = P701 + difx - dify$ $Q708 = P701 - difx + dify$ $Q709 = P701 + difx + dify$ and, the number of times required for obtaining the intensity Q706 through Q709 of four new pixels from the intensity P701 of one pixel of interest are only ten times addition or subtraction and two times division.

In addition, if the calculation of P701−difx and P701+difx are shared, the intensity of four new pixels can be obtained by eight times addition and subtraction and two times division.

Next, the operation will be described.

The horizontal subtracter 1114 receives as its inputs the data of a right pixel from the right pixel data buffer 1107 and the data of a left pixel from the left pixel data buffer 1109, and subtracts the data of the left pixel from the data of the right pixel, and outputs the difference in the horizontal direction to the horizontal arithmetic device 1216. The horizontal arithmetic device 1216 shifts the difference in the horizontal direction leftward to ⅛ and outputs the horizontal correction value to the upper left new pixel data calculator 1218, the upper right new pixel data calculator 1219, the lower left new pixel data calculator 1220, and the upper right new pixel data calculator 1221. Further, the vertical subtracter 1115 receives as its inputs the data of the lower pixel from the lower pixel data buffer 1111 and inputs the data of upper pixel from the upper pixel data buffer 1113, and subtracts the data of the upper pixel from the data of the lower pixel, and outputs the difference in the vertical direction to the vertical arithmetic device 1217. The vertical arithmetic device 1217 shifts the difference in the vertical direction leftward to ⅛ and outputs the vertical correction value to the upper left new pixel data calculator 1218, the upper right new pixel data calculator 1219, the lower left new pixel data calculator 1220 and the upper right new pixel data calculator 1221.

The upper left new pixel data calculator 1218 receives as its input the vertical correction value from the vertical arithmetic device 1217, the horizontal correction value from the horizontal arithmetic device 1216, and the data of the pixel of interest from the pixel of interest data buffer 1108, respectively, and then subtracts the vertical correction value and the horizontal correction value from the data of the pixel of interest and outputs the data of the new pixel to be interpolated to the upper new pixel line memory 1222. The upper right new pixel data calculator 1219 subtracts the vertical correction value from the data of pixel of interest and adds the horizontal correction value, and output the data of new pixel to be interpolated to the upper new pixel line memory 1222. The lower left new pixel data calculator 1220 adds the vertical correction value to the data of the pixel of interest and subtracts the horizontal correction value, and outputs the data of the new pixel to be interpolated to the lower new pixel line memory 1223. The lower right new pixel data calculator 1221 adds the vertical correction value to the data of the pixel of interest and adds the horizontal correction value, and outputs the data of the new pixel to be interpolated to the lower next pixel line memory 1223.

The upper new pixel line memory 1222 receives as its input the data from the upper left new pixel data calculator 1218 and subsequently the data from the upper right new pixel data calculator 1219 by 1 pixel alternately, and stores the data of new pixel to be interpolated at the upper side of the pixel of interest for 1 line of the high-resolution image, and outputs all of 1 line in the order of storing. The lower new pixel line memory 1223 receives as its input the data from the lower left new pixel data calculator 1220 and subsequently the data from the lower right new pixel data calculator 1221 by 1 pixel alternately, and stores the data of the new pixel to be interpolated at the lower side of the pixel of interest for 1 line of high-resolution image, and outputs all of 1 line in the order of storing, after the upper new pixel line memory 1222 outputs the data of 1 line.

Next, a calculation procedure of the arithmetic means 1233 will be described by referring to FIG. 8.

Figure 8:
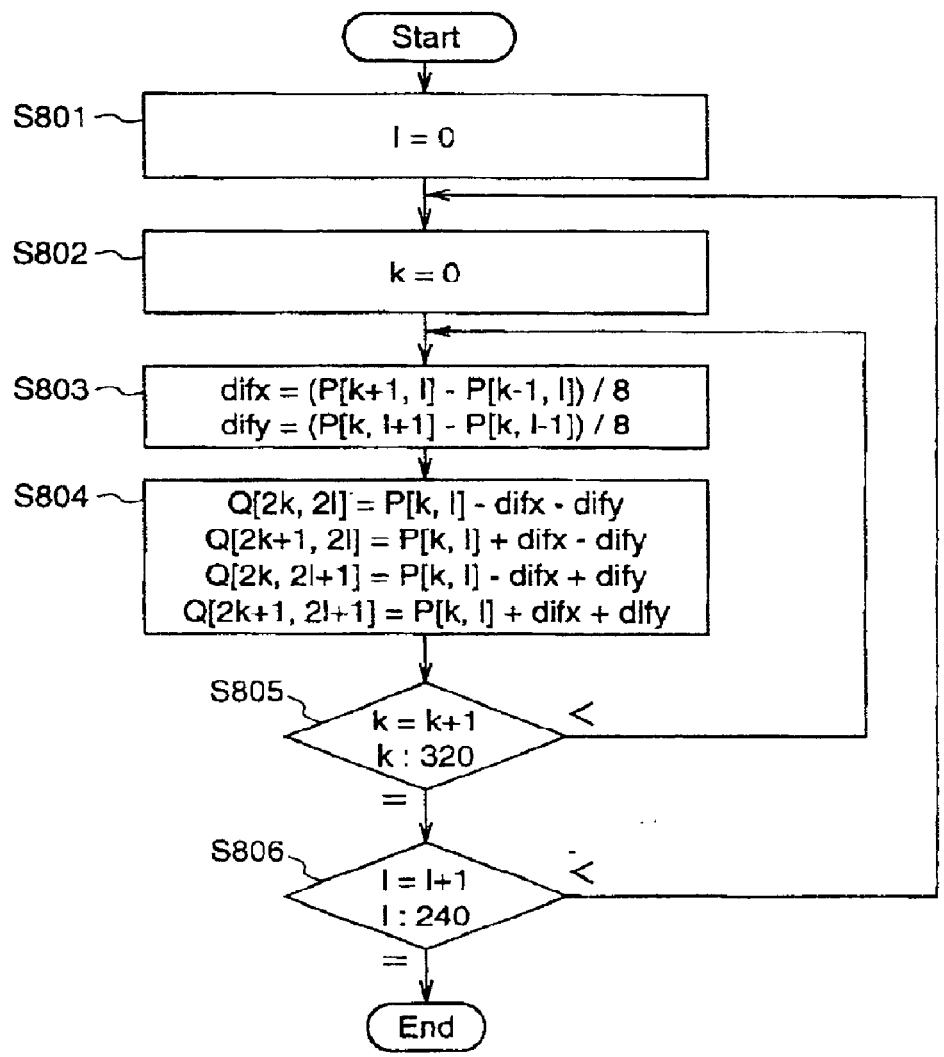
FIG. 8 is a flow chart showing a calculation procedure for performing resolution conversion from an image of horizontal 320×vertical 240 pixels to horizontal 640×vertical 480 pixels by interpolating to twice the number of pixels in the horizontal and vertical directions, respectively, in the image processor according to the second embodiment of the present invention.

FIG. 8 is a flow chart showing a calculation procedure for performing resolution conversion from horizontal 3200× vertical 240 pixels to horizontal 640×vertical 480 pixels by interpolating to twice the number of pixels in both of the horizontal and vertical directions in the image processor according to the second embodiment of the present invention.

In FIG. 8, difx is a horizontal correction value, dify is a vertical correction value, and k, I, Q, P are the same as those in FIG. 1, and there are relations of $0 \leq k < 320$, $0 \leq 1 < 240$.

S801 denotes a vertical loop default initial setting up step for setting an initial value to a variable related to a vertical loop, which assigns an initial value 0 to the vertical loop counter 1.

S802 denotes a horizontal loop default initial setting up step for setting an initial value to a variable related to a horizontal loop, which assigns an initial value 0 to the horizontal loop counter k.

S803 denotes a correction value calculating step for calculating a correction value in both the horizontal and vertical directions, which obtains the horizontal correction value difx and the vertical correction value dify by calculating difx=(P[k+1,1]−P[k−1,1])/8, dify=(P[k,1+1]−P[k,1−1])/8, respectively.

S804 denotes an intensity calculating step for calculating the intensity of four new pixels, and the intensity of the new pixel for interpolation to the upper left of the pixel of interest Q[2k,21], the intensity of the new pixel for interpolation to the upper right of the pixel of interest Q[2k+1,21], the intensity of the new pixel for interpolation to the lower left of the pixel of interest Q[2k,21+1], and the intensity of the new pixel for interpolation at the lower right of the pixel of interest Q[2k+1,21] by calculating Q[2k,21]=P[k,1]-difx-dify, Q[2k+1,21]=P[k,1]+difx-dify, Q[2k,21+1]=P[k,1]−difx+dify, Q[2k+1,21+1]=P[k,1]+difx+dify respectively.

S805 denotes a horizontal loop conclusion judging step for judging the conclusion of a horizontal loop which comprises repeating steps S803 through S805, which compares new horizontal loop counter k which is obtained by adding 1 to the horizontal loop counter k with the number of pixels 320 in the horizontal direction of a low-resolution image, and according to the result, it proceeds to step S803 when the new horizontal loop counter k is smaller than 320 while it proceeds to step S806 when it is equal to 320.

S806 denotes a vertical loop conclusion judging step for judging the conclusion of a vertical loop which comprises repeating steps S802 through S806, which compares new vertical loop counter 1 which is obtained by adding 1 to the vertical loop counter 1 with the number of pixels 240 in the vertical direction of a low-resolution image, and according to the result, it proceeds to step S802 when new vertical loop counter 1 is smaller than 240 while it terminates pixel interpolation of an image when it is equal to 240.

The new pixel data Q[2k, 21], Q[2k+1,21], Q[2k, 21+1] and Q[2k+1,21+1] which are obtained by the above-described operation will be transferred to the upper new pixel line memory 1222 in the order of Q[2k,21], Q[2k+1, 21], and transferred to the lower new pixel line memory 1223 in the order of Q[2k,21+1], Q[2k+1,21+1].

In the image processor according to the second embodiment of the present invention, the image processor for converting a low-resolution image to a high-resolution image having twice the number of pixels in both the vertical and horizontal directions includes a pixel selection means 1130 for extracting a pixel of interest, an upper pixel, a lower pixel, a left pixel, and a right pixel, the vertical subtracter 1115 for calculating the difference in the vertical direction based upon the data of the upper and the lower pixel, the horizontal subtracter 1114 for calculating the difference in the horizontal direction based upon the data of the left and the right pixel, the vertical arithmetic device 1117 for calculating the vertical correction value based upon the difference in the vertical direction and the distance from a pixel of interest to a new pixel in the vertical direction, the horizontal arithmetic device 1116 for calculating the horizontal correction value based upon the difference in the horizontal direction and the distance from a pixel of interest to the new pixel in the horizontal direction, and the new pixels data calculator 1235 for calculating the data of the new pixel which are positioned at an upper left, an upper right, a lower left, and a lower right of the pixel of interest based upon the data of the pixel of interest, the vertical correction value, and the horizontal correction value, and the maintenance means 1234 for holding the data of the new pixel which is calculated by the new pixel data calculator 1235 temporarily, and outputting the data sequentially from the upper left new pixel of high-resolution image, and the position of the new pixel is made such that the absolute values of the distances from the pixel of interest are V4 in both the horizontal and vertical directions. This can improve the processing speed by reducing the operation amount by maintaining the appearance probability of the error of the pixel data as well as provide images with sharpness without smoothing edge parts of the image.

(Embodiment 3)

The image processor according to a third embodiment is one which converts a low-resolution image of horizontal 320×vertical 240 pixels to a high-resolution image of horizontal 320×vertical 480 pixels by interpolating to twice the number of pixels in the vertical direction, which is used for image processing for generating a frame screen by interpolating a field screen of an interlace signal such as an NTSC signal which is used for current TV broadcasting.

Figure 13:
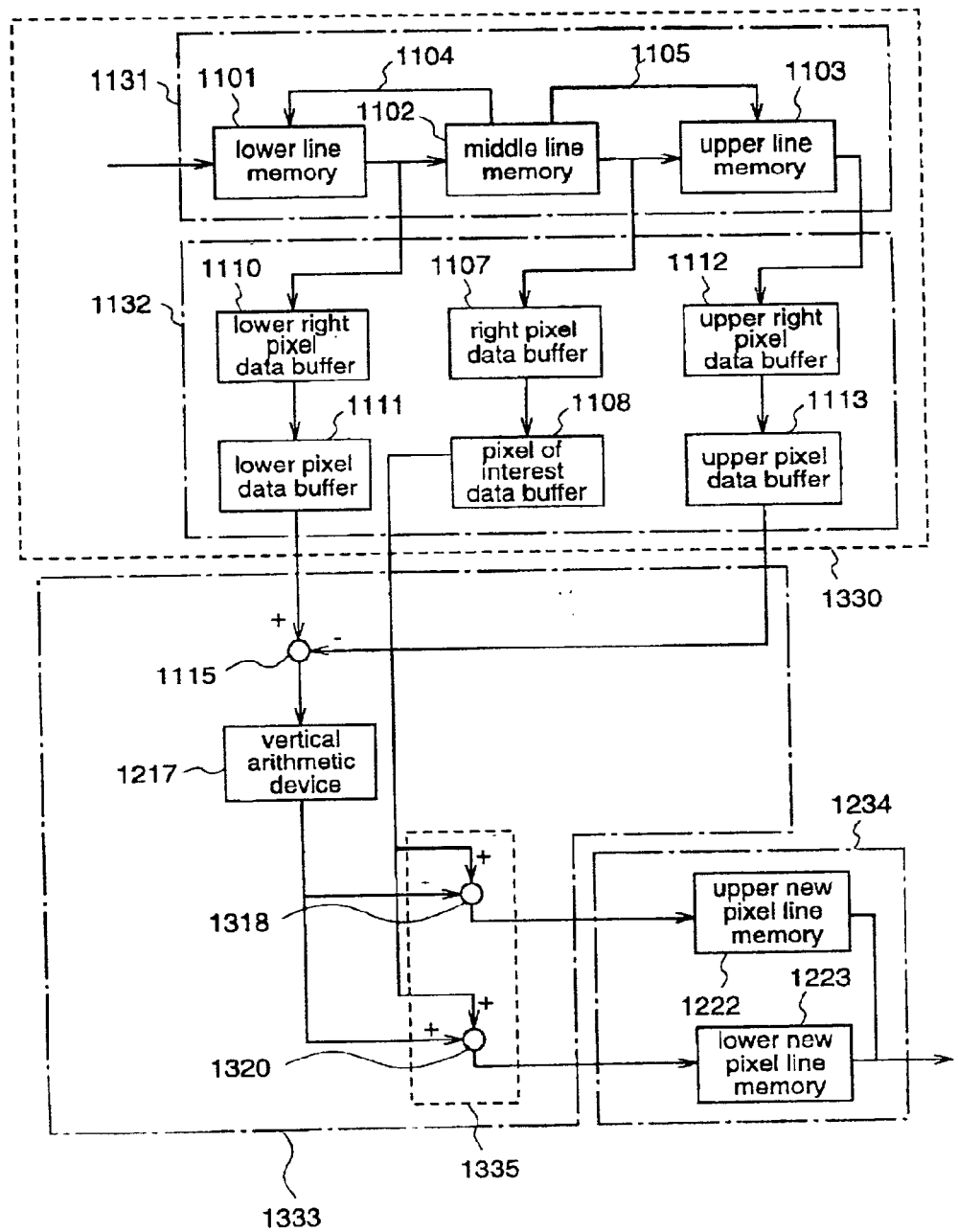
FIG. 13 is a block diagram showing the construction of the image processor according to the third embodiment of the present invention.
Figure 14:
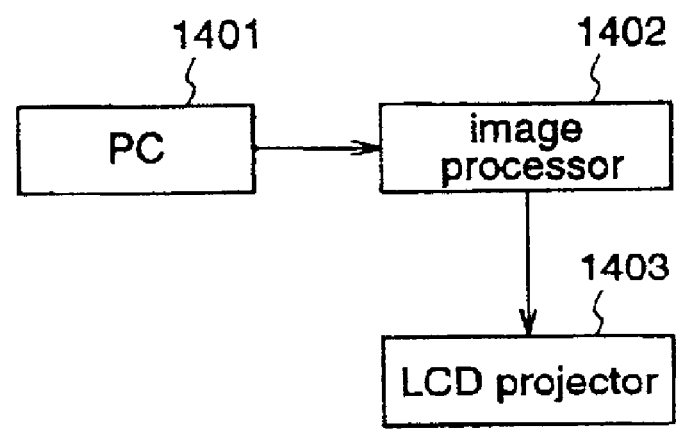
FIG. 14 is a diagram showing an example of a situation where the image processor as a target of the present invention is employed.

FIG. 13 is a block diagram showing a construction of the image processor according to the third embodiment.

In FIG. 13, the same reference numerals denotes the same elements as in FIG. 11 or FIG. 12, 1333 denotes a new pixel data arithmetic means, constructed as follows.

Numerals 1115 and 1217 denotes the same elements in FIG. 11 or FIG. 12, 1318 denotes the upper new pixel data calculator for calculating the data of the new pixel for interpolation at the upper of the pixel of interest, 1320 denotes the lower new pixel data calculator for calculating the data of the new pixel for interpolation to the lower of the pixel of interest, 1335 denotes a new pixel data calculator which is constituted by the upper new pixel data calculator 1318 and the lower new pixel data calculator 1320.

Further, in the pixel selection means 1330 the image processor according to the third embodiment has a configuration having omitted the left pixel data buffer 1109 and the left end processing path 1106 in the pixel selection means 1130 in FIG. 12.

Figure 9:
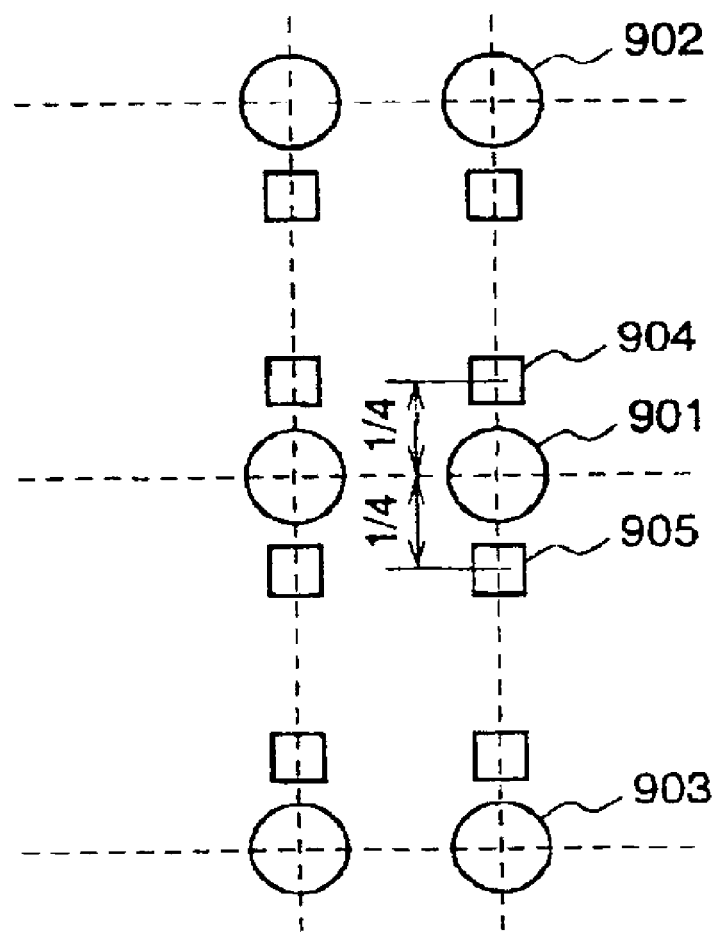
FIG. 9 is a diagram illustrating the position of a new pixel which is interpolated by the image processor according to the third embodiment of the present invention.

FIG. 9 is a diagram illustrating the position of the new pixel which is interpolated by the image processor according to the third embodiment.

In FIG. 9, "○" denotes an original pixel of a low-resolution image having a pixel interval being "1", "□" denotes a new pixel of a high-resolution image. Further, a new pixel matches the position of an original pixel, and is positioned at a point which is distant from the original pixel in the vertical direction by ¼. Have in the absolute value, the intensity of original pixels of 901, 902, 903 and new pixels of 904 and 905 are designated as P901, P902, P903, Q904 and Q905.

According to this pixel arrangement, all the new pixels are arranged at equal intervals from the original pixels so as to make uniform the appearance probability of error of pixel data.

Though a large calculation amount is required because it is necessary to create all new pixels in the arrangement, by employing a similar devise as in the second embodiment of the present invention, the operation amount can be suppressed.

To be specific, if $dify=(⅛)(P903-P902)$ is first calculated on the basis of original pixels 901, 902, 903 the arithmetic expression for calculating the intensity of new pixels Q904, Q905 becomes as follows, $Q904=P901-difx$ $Q905=P901+difx$ and, a number of times required for calculating the intensity Q904 and Q905 of two new pixels from the intensity P901 of the pixel of interest are three times addition or subtraction and one division.

Hereinafter, an operation of new pixel data arithmetic means 1333 will be described.

The vertical subtracter 1115 receives as its input the lower pixel data from the lower pixel data buffer 1111, and the upper pixel data from the upper pixel data buffer 1113, and subtracts the upper pixel data from the lower pixel data, and outputs the difference in the vertical direction to the vertical arithmetic device 1217. The vertical arithmetic device 1217 shifts the difference in the vertical direction leftward by 3 bits to ⅛ and outputs the vertical correction value to the upper new pixel data calculator 1318 and the lower new pixel data calculator 1320.

The upper new pixel data calculator 1318 receives as its inputs the vertical correction value from the vertical arithmetic device 1217, and the data of pixel of interest from the pixel of interest data buffer 1108, and subtracts the vertical correction value from the data of the pixel of interest and outputs the data of the new pixel for interpolation at the upper of the pixel of interest. The lower new pixel data calculator 1320 adds the vertical correction value to the data of the pixel of interest and outputs the data of the new pixel to be interpolated at the lower of the pixel of interest to the lower new pixel line memory 1223.

The upper new pixel line memory 1222 stores the data of the new pixel to be interpolated at the upper of the pixel of interest by 1 line of the high-resolution image, and outputs all the 1 line in the order of storing. The lower new pixel line memory 1223 stores the data of the new pixel to be interpolated at the lower of the pixel of interest by 1 line of high-resolution image, and outputs all the 1 line in the order of storing, after the upper new pixel line memory 1222 outputs the data of 1 line.

Hereinafter, an operation procedure of the new pixel data arithmetic means 1333 will be described.

Figure 10:
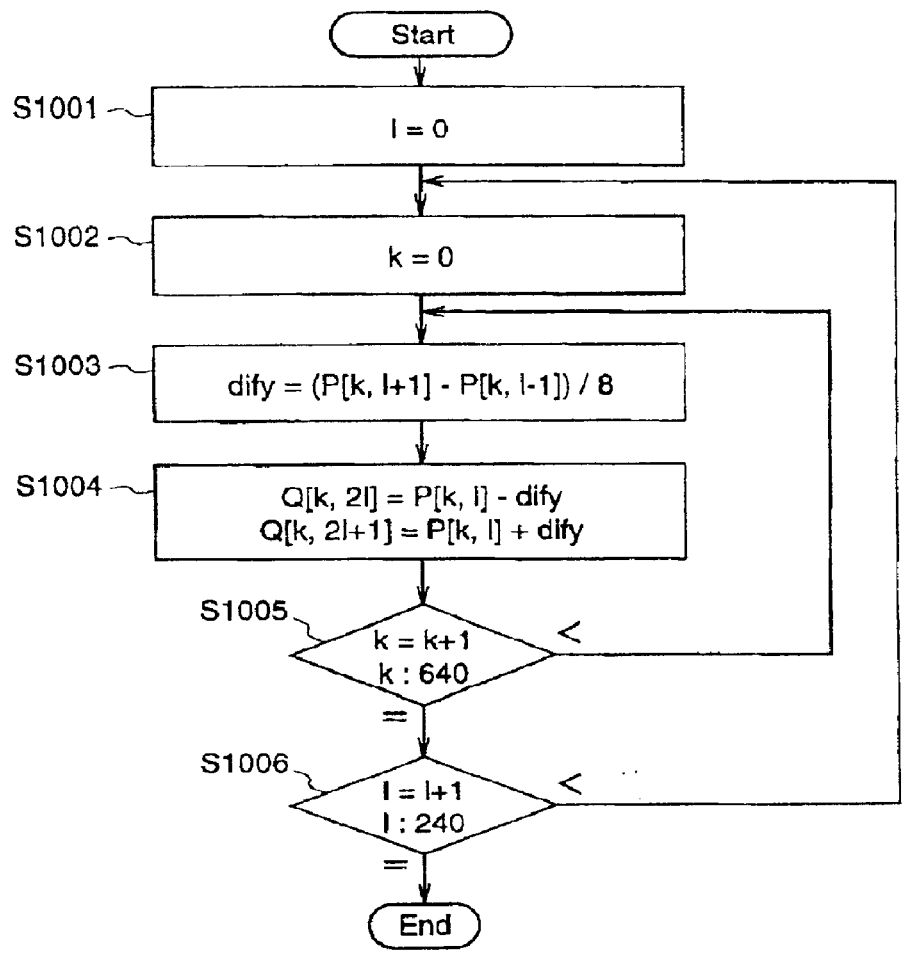
FIG. 10 is a flow chart showing an operation procedure for performing resolution conversion from horizontal 320× vertical 240 pixels to horizontal 320×vertical 480 pixels by interpolating to twice the number of pixels in the vertical direction in the image processor according to the third embodiment of the present invention.

FIG. 10 is a flow chart showing an operation procedure for performing resolution conversion of horizontal 3200× vertical 240 pixels to horizontal 320×vertical 480 pixels by interpolating to twice the number of pixels in the vertical direction in the image processor according to the third embodiment of the present invention.

In FIG. 10, dify, k, L, Q, P denotes the same elements as those in FIG. 1 or FIG. 8, and there are relations of $0≦k<320, 0≦1<240$.

S1001 denotes a vertical loop default setting up step for setting the initial value to a variable related to the vertical loop, which assigns the initial value 0 to the vertical loop counter 1.

S1002 denotes a horizontal loop default setting up step for setting the initial value to a variable related to the horizontal loop, which assigns the initial value 0 to the horizontal loop counter k.

S1003 denotes a correction value calculating step for obtaining the correction value in the vertical direction, the vertical correction value dify is calculated by o $dify=(P[k,1+1]-P[k,1-1])/8$.

S1004 denotes an intensity calculating step for obtaining the intensity of two new pixels, which calculates the intensity Q[k,21] of the new pixel to be interpolated at the upper side of the pixel of interest and the intensity Q[k,21+1] of the new pixel to be interpolated at the lower side of the pixel of interest by $Q[k,21]=P[k,1]-dify$ and $Q[k,21+1]=P[k,1]+dify$ respectively.

S1005 denotes a horizontal loop conclusion judging step for judging the conclusion of horizontal loop repeating steps S1003 through S1005, and it compares new horizontal loop counter k obtained by adding 1 to the horizontal loop counter k with the number of pixels 320 in the horizontal direction of low-resolution image, and according to the result, it proceeds to step S1003 when where new horizontal loop counter k is smaller than 320 while it proceeds to step S1006 when it is equal to 320.

S1006 denotes a vertical loop conclusion judging step for judging the end of vertical loop repeating steps S1002 through S1006, and it compares new vertical loop counter 1 obtained by adding 1 to the vertical loop counter 1 with the number of pixels 240 in the vertical direction of low-resolution image, and according to the result, it proceeds to step S1002 when new vertical loop counter 1 is smaller than 240 while it terminates a pixel interpolation of an image when it is equal to 240.

New pixel data Q[k,21] and Q[k,21+1] are calculated by the above-mentioned operation procedure, and Q[k,21] is transferred to the upper new pixel line memory 1222 and Q[k,21+1] is transferred to the lower new pixel line memory 1223.

Accordingly, in the image processor according to the third embodiment of the present invention, the image processor for converting a low-resolution image to a high-resolution image having twice the number of pixels in the vertical direction includes a pixel selection means 1330 for extracting a pixel of interest, an upper pixel, and a lower pixel, the vertical subtracter 1115 for obtaining the difference in the vertical direction on the basis of the data of an upper and a lower pixel, the vertical arithmetic device 1217 for calculating the vertical correction value on the basis of the difference in the vertical direction and the distance from a pixel of interest to the new pixel in the vertical direction, the new pixel data calculator 1335 for calculating the data of new pixel which are positioned at the upper side and the lower side of the pixel of interest on the basis of the data of the pixel of interest and the vertical correction value, and the maintenance means 1234 for holding the data of the new pixel which is calculated by the new pixel data calculator 1335 temporarily and outputting the data sequentially from the upper left new pixel of high-resolution image, and the position of the new pixel is made such that the absolute value of the distance from the pixel of interest in the vertical direction is ¼, thereby improving processing speed by making uniform the appearance ratio of error of the pixel data and further reducing the amount of calculation, as well as obtaining a high-quality image with sharpness without edge parts of the image being smoothed.

Though in the above first to third embodiments a pixel data is assumed to be only intensity data, the pixel data may be color data or color difference date of RGB, GMYK, and the like, with the same effect described above being obtained.

Further, in the first to third embodiments, an image processor and an image processing method as an operation flowchart are described, but these can be realized by a computer program which is recorded in a recording medium such as ROM, and operates similarly as the image processing method in the first to third embodiments with the same effects obtained.

APPLICABILITY IN INDUSTRY

As mentioned above, the image processor, the image processing method and the image processing program recording medium according to the present invention can obtain a high-quality image with sharpness in spite of requiring a reduced amount of interpolation arithmetic to increase an image resolution, short processing time and small scale hardware, and further, it is possible to make uniform the appearance probability of error by employing a pixel data having a pixel arrangement which minimizes the arithmetic operation amount.

What is claimed is:

1. An image processing apparatus which converts a low-resolution image to a high-resolution image comprising:
    a pixel selector operable to select a pixel of interest which is located at a position closest to a pixel for interpolation to be newly generated between pixels (hereinafter referred to as "new pixel") and adjacent pixels adjacent to the pixel of interest, from pixels of the low-resolution image; and
    a new pixel data calculation unit operable to calculate a difference between the adjacent pixels, calculate an amending value on a basis of the difference and a distance between the pixel of interest and the new pixel, and calculate a data value of the new pixel on the basis of data of the pixel of interest, the difference, and the amending value.

2. An image processing method which converts a low-resolution image to a high-resolution image comprising:
    selecting a pixel of interest which is located at a position closest to a pixel for interpolation to be newly generated between pixels (hereinafter referred to as "new pixel") and adjacent pixels adjacent to the pixel of interest, from pixels of the low-resolution image; and
    calculating a difference between the adjacent pixels, calculating an the amending value on a basis of the difference and a distance between the pixel of interest and the new pixel, and calculating a data value of the new pixel on a basis of the data of the pixel of interest, the difference, and the amending value.

3. An image processing program recording medium having stored an image processing program performing conversion of a low-resolution image into a high-resolution image therein, which program comprises:
    selecting a pixel of interest which is located at a position closest to a pixel for interpolation to be newly generated between pixels (hereinafter, referred to as "new pixel") and adjacent pixels adjacent to the pixel of interest, from the pixels of the low-resolution image; and
    calculating a difference between the adjacent pixels calculating an the amending value on a basis of the difference and a distance between the pixel of interest and the new pixel, and calculating a data value of the new pixel on a basis of the data of the pixel of interest, the difference, and the amending value.

4. The image processor as defined in claim 1, wherein the pixel selector selects the following:
    data A of the pixel of interest of the low-resolution image, located at a position closest to the pixel for interpolation to be newly generated between pixels of the low-resolution image having a distance of "1" between adjacent pixels,
    data B of an upper pixel of the low-resolution image adjacent to the pixel of interest at an upper side thereof,
    data C of a lower pixel of the low-resolution image adjacent to the pixel of interest at a lower side thereof,
    data D of a left pixel of the low-resolution image adjacent to the pixel of interest at a left side thereof,
    and data E of a right pixel of the low-resolution image adjacent to the pixel of interest at a right side thereof; and wherein the new pixel data calculation unit calculates data F of the new pixel composing the high-resolution image by a formula of F=A+(i/2) (E−D)+(j/2)(C−B), on the basis of the data A of the pixel of interest, the data B of the upper pixel, the data C of the lower pixel, the data D of the left pixel, the data E of the right pixel, and a position of the new pixel which is represented by a distance "i" in the horizontal direction and a distance "j" in the vertical direction from the pixel of interest to the new pixel.

5. The image processing method as defined in claim 2, wherein said selecting selects the following:

data A of the pixel of interest of the low-resolution image, located at a position closest to the pixel for interpolation to be newly generated between pixels of the low-resolution image having a distance of "1" between adjacent pixels, data B of an upper pixel of the low-resolution image adjacent to the pixel of interest at an upper side thereof, data C of a lower pixel of the low-resolution image adjacent to the pixel of interest at a lower side thereof, data D of a left pixel of the low-resolution image adjacent to the pixel of interest at a left side thereof, and data E of a right pixel of the low-resolution image adjacent to the pixel of interest at a right side thereof; and wherein said calculating calculates data F of the new pixel composing the high-resolution image by a formula of F=A+(i/2)(E−D)+(j/2)(C−B), on the basis of the data A of the pixel of interest, the data B of the upper pixel, the data C of the lower pixel, the data D of the left pixel, the data E of the right pixel, and a position of the new pixel which is represented by a distance "i" in the horizontal direction and a distance "j" in the vertical direction from the pixel of interest to the new pixel.

6. The image processing recording medium as defined in claim 3, wherein said selecting selects the following:

data A of the pixel of interest of the low-resolution image, located at a position closest to the pixel for interpolation to be newly generated between pixels of the low-resolution image having a distance of "1" between adjacent pixels, data B of an upper pixel of the low-resolution image adjacent to the pixel of interest at an upper side thereof, data C of a lower pixel of the low-resolution image adjacent to the pixel of interest at a lower side thereof, data D of a left pixel of the low-resolution image adjacent to the pixel of interest at a left side thereof, and data E of a right pixel of the low-resolution image adjacent to the pixel of interest at a right side thereof; and wherein said calculating calculates data F of the new pixel composing the high-resolution image by a formula of F=A+(i/2)(E−D)+(j/2)(C−B), on the basis of the data A of the pixel of interest, the data B of the upper pixel, the data C of the lower pixel, the data D of the left pixel, the data E of the right pixel, and a position of the new pixel which is represented by a distance "i" in the horizontal direction and a distance "j" in the vertical direction from the pixel of interest to the new pixel.

7. The image processor as defined in claim 4, wherein:

when generating the high-resolution image having twice number of pixels in each of the horizontal and vertical directions for the low-resolution image, the position of new pixels is set by making an absolute value of the distance "i" in the horizontal direction and that of the distance "j" in the vertical direction from the pixel of interest be ¼, respectively, and the new pixel data calculating, when calculating data F1, F2, F3 and F4 of the new pixels located at an upper left, an upper right, a lower left, and a lower right of the pixel of interest, respectively, by F=A+(i/2)(E−D)+(j/2)(C−B), previously calculates X=(i/2)(E−D) and Y=(j/2)(C−B), and then calculates F1=A−X−Y, F2=A+X−Y, F3=A−X+Y, and F4=A+X+Y.

8. The image processing method as defined in claim 5, wherein:

when generating the high-resolution image having twice a number of pixels in both the horizontal and vertical direction for the low-resolution image, the position of new pixels is set by making an absolute value of the distance "i" in the horizontal direction and the distance "j" in the vertical direction from the pixel of interest be ¼, respectively, and said calculating, when calculating data F1, F2, F3 and F4 of the new pixels located at an upper left, an upper right, a lower left, and a lower right of the pixel of interest, respectively, by F=A+(i/2)(E−D)+(j/2)(C−B), previously calculates X=(i/2)(E−D) and Y=(j/2)(C−B), and then calculates F1=A−X−Y, F2=A+X−Y, F3=A−X+Y, and F4=A+X+Y.

9. The image processing program recording medium as defined in claim 6, wherein:

when generating the high-resolution image having twice a number of pixels in both the horizontal and vertical directions for the low-resolution image, the position of new pixels is set by making an absolute value of the distance "i" in the horizontal direction and the distance "j" in the vertical direction from the pixel of interest be ¼, respectively, and said calculating, when calculating data F1, F2, F3 and F4 of the new pixels located at an upper left, an upper right, a lower left, and a lower right of the pixel of interest, respectively, by F=A+(i/2)(E−D)+(j/2)(C−B), previously calculates X=(j/2)(E−D) and Y=(j/2)(C−B) and then calculates F1=A−X−Y, F2=A+X−Y, F3=A−X+Y, and F4=A+X+Y.

10. The image processor as defined in claim 1, wherein the pixel selector selects the following:

data A of the pixel of interest located at a position closest to the pixel for interpolation to be newly generated between pixels of the low-resolution image having a distance between adjacent pixels being "1", data B of an upper pixel of the low-resolution image adjacent to an upper side of the pixel of interest, data C of a lower pixel of the low-resolution image adjacent to a lower side of the pixel of interest, and wherein the new pixel data calculation unit calculates data F of the new pixel by a formula of F=A+(j/2)(C−B) on the basis of the data A of the pixel of interest, the data B of the upper pixel, the data C of the lower pixel, and a distance "j" in a vertical direction from the pixel of interest to the new pixel.

11. The image processing method as defined in claim 2, wherein said selecting selects the following:

data A of the pixel of interest located at a position closest to the pixel for interpolation to be newly generated between pixels of the low-resolution image having a distance between adjacent pixels being "1", data B of an upper pixel of the low-resolution image adjacent to an upper side of the pixel of interest, data C of a lower pixel of the low-resolution image adjacent to a lower side of the pixel of interest, and wherein said calculating calculates data F of the new pixel by a formula of F=A+(j/2)(C−B) on the basis of the data A of the pixel of interest, the data B of the upper pixel, the data C of the lower pixel, and a distance "j" in a vertical direction from the pixel of interest to the new pixel.

12. The image processing program recording medium as defined in claim 3, wherein said selecting selects the following:

data A of the pixel of interest located at a position closest to the pixel for interpolation to be newly generated between pixels of the low-resolution image having a distance between adjacent pixels being "1", data B of an upper pixel of the low-resolution image adjacent to an upper side of the pixel of interest, data C of a lower pixel of the low-resolution image adjacent to a lower side of the pixel of interest, and wherein said calculating calculates data F of the new pixel by a formula of F=A+(j/2)(C−B) on the basis of the data A of the pixel of interest, the data B of the upper pixel, the data C of the lower pixel, and a distance "j" in a vertical direction from the pixel of interest to the new pixel.

13. The image processor as defined in claim 10, wherein:

when generating the high-resolution image having twice a number of pixels in the vertical direction for the low-resolution image, the position of new pixels is set by making an absolute value of the distance "j" in the vertical direction from the pixel of interest be ¼, and said calculating, when calculating data F5 and F6 of the new pixels located at the upper side and the lower side of the pixel of interest, respectively, by a formula of F=A+(j/2)(C−B), calculates Y=(j/2)(C−B) previously, and then calculates F5=A−X and F6=A+Y.

14. The image processing method as defined in claim 11, wherein:

when generating the high-resolution image having twice a number of pixels in the vertical direction for said low-resolution image, the position of new pixels is set by making an absolute value of the distance "j" in the vertical direction from the pixel of interest be ¼, and said calculating, when calculating data F5 and F6 of the new pixels located at the upper side and the lower side of the pixel of interest, respectively, by a formula of F=A+(j/2)(C−B), previously calculates Y=(j/2)(C−B), and then calculates F5=A−X and F6=A+Y.

15. The image processing program recording medium as defined in claim 12, wherein:

when generating the high-resolution image having twice a number of pixels in the vertical direction for the low-resolution image, the position of new pixels is set by making an absolute value of the distance "j" in the vertical direction from the pixel of interest be ¼, and said calculating, when calculating data F5 and F6 of the new pixels located at the upper side and the lower side of the pixel of interest, respectively, by a formula of F=A+(j/2)(C−B), previously calculates Y=(j/2)(C−B), and then calculates F5=A−F and F6=A+Y.

* * * * *